United States Patent
Wakasugi

(10) Patent No.: US 7,602,411 B2
(45) Date of Patent: Oct. 13, 2009

(54) IMAGE FORMING APPARATUS

(75) Inventor: Nobuo Wakasugi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 257 days.

(21) Appl. No.: 10/864,464

(22) Filed: Jun. 10, 2004

(65) Prior Publication Data

US 2004/0252182 A1 Dec. 16, 2004

(30) Foreign Application Priority Data

Jun. 12, 2003 (JP) .............................. 2003-168174

(51) Int. Cl.
*B41J 2/47* (2006.01)
*B41J 2/385* (2006.01)
*G06K 15/00* (2006.01)

(52) U.S. Cl. ..................... 347/251; 347/253; 347/254; 347/131; 358/3.1

(58) Field of Classification Search ................. 347/251, 347/238, 253, 237, 254, 131; 358/3.1
See application file for complete search history.

(56) References Cited

U.S. PATENT DOCUMENTS

| | | | |
|---|---|---|---|
| 4,525,729 A | | 6/1985 | Agulnek et al. |
| 4,916,530 A | * | 4/1990 | Neilson et al. ............... 347/238 |
| 5,187,495 A | * | 2/1993 | Tanimoto et al. ............ 347/251 |
| 5,232,294 A | | 8/1993 | Inui |
| 5,539,525 A | * | 7/1996 | Tanuma et al. ............. 358/3.02 |
| 5,926,616 A | * | 7/1999 | Sato et al. ..................... 358/1.2 |
| 6,016,206 A | * | 1/2000 | Koide et al. ................ 358/3.02 |
| 6,108,023 A | * | 8/2000 | Seino .......................... 347/236 |
| 6,161,919 A | * | 12/2000 | Klassen ........................ 347/43 |
| 6,169,566 B1 | * | 1/2001 | Katakura .................... 347/240 |
| 6,466,335 B1 | * | 10/2002 | Umezawa et al. ............ 358/1.9 |
| 6,643,032 B1 | * | 11/2003 | Crean et al. ................ 358/3.06 |
| 6,819,352 B2 | * | 11/2004 | Mizes et al. ................. 347/240 |
| 7,084,991 B2 | * | 8/2006 | Miguel et al. ................ 358/1.1 |
| 2003/0007024 A1 | * | 1/2003 | Fujimori ...................... 347/15 |

FOREIGN PATENT DOCUMENTS

| | | |
|---|---|---|
| EP | 0 663 759 A1 | 7/1995 |
| EP | 0 671 844 A1 | 9/1995 |
| JP | 1-272469 | 10/1989 |
| JP | 5-221021 | 8/1993 |
| JP | 6-155803 | 6/1994 |
| JP | 6-238920 | 8/1994 |
| JP | 2002-79710 | 3/2002 |
| JP | 2002-86800 | 3/2002 |

* cited by examiner

*Primary Examiner*—Manish S Shah
*Assistant Examiner*—Sarah Al-Hashimi
(74) *Attorney, Agent, or Firm*—Rabin & Berdo, PC

(57) ABSTRACT

An image forming apparatus receives halftone print data through an inputting section. A dot forming section irradiates the charged surface of an image bearing body with light to form a plurality of lines of dots in accordance with the halftone data. Dots on a same line have the same exposure energy and dots on different lines in a same pixel have different exposure energies. The plurality of lines may include as many lines as there are bits in the halftone print data. The plurality of lines may include a first predetermined number of lines and the halftone print data includes a second predetermined number of bits different from the first predetermined number. A conversion table converts halftone print data having a first number of bits into corresponding energy data having a second number of bits.

18 Claims, 18 Drawing Sheets

| HALFTONE VALUE | EXPOSURE ENERGY LEVEL | WEIGHT ON SUB-LINES | | | | | |
|---|---|---|---|---|---|---|---|
| | | SUB. LINE 5 "32" | SUB. LINE 4 "16" | SUB. LINE 3 "8" | SUB. LINE 2 "4" | SUB. LINE 1 "2" | SUB. LINE 0 "1" |
| 0 | 18 | | O | | | O | |
| 1 | 22 | | O | | O | | |
| 2 | 25 | | O | | O | O | O |
| 3 | 27 | | O | O | | O | O |
| 4 | 28 | | O | O | O | | |
| 5 | 29 | | O | O | O | | O |
| 6 | 30 | | O | O | O | O | |
| 7 | 31 | | O | O | O | O | O |
| 8 | 32 | O | | | | | |
| 9 | 33 | O | | | | | O |
| 10 | 34 | O | | | | O | |
| 11 | 35 | O | | | | O | O |
| 12 | 36 | O | | | O | | |
| 13 | 38 | O | | | O | O | |
| 14 | 42 | O | | O | | O | |
| 15 | 63 | O | O | O | O | O | O |

HALFTONE VALUE = 68

HALFTONE VALUE = 58

HALFTONE VALUE = 7
E1

HALFTONE VALUE = 8
E2

| HALFTONE VALUE | EXPOSURE ENERGY | SUB LINES | | | | | | | |
|---|---|---|---|---|---|---|---|---|---|
| | | | #6 "64" | #5 "32" | #4 "16" | #3 "8" | #2 "4" | #1 "2" | #0 "1" |
| 0 | 0 | | O | | | | | | |
| 1 | 24 | | O | | | O | O | | |
| 2 | 32 | | O | | O | | | | |
| 3 | 37 | | O | | O | | | O | O |
| 4 | 41 | | O | | O | | O | | O |
| 5 | 43 | | O | | O | | O | O | O |
| 6 | 46 | | O | | O | | O | O | O |
| 7 | 48 | | O | | O | O | | | |
| 8 | 49 | | O | | O | O | | | O |
| 9 | 52 | | O | | O | O | O | | |
| 10 | 54 | | O | | O | O | O | O | |
| 11 | 57 | | O | | O | O | O | | O |
| 12 | 61 | | O | | O | O | O | O | O |
| 13 | 66 | | O | O | | | | O | |
| 14 | 75 | | O | O | | | O | O | O |
| 15 | 112 | | O | O | O | O | | | |

IMAGE FORMING APPARATUS

FIELD OF THE INVENTION

The present invention relates to an image-forming apparatus.

DESCRIPTION OF RELATED ART

A conventional image-forming apparatus such as a printer, a facsimile machine and a copying machine, is provided with an image-forming section. For example, an electrophotographic printer includes a photoconductive drum covered with a photoconductive insulating layer. A charging unit charges the surface of the photoconductive drum uniformly. An exposing unit selectively illuminates the charged surface of the photoconductive drum to dissipate the charges in areas exposed, thereby forming an electrostatic latent image. A developing unit applies a developer such as toner to the electrostatic latent image, thereby developing the electrostatic latent image into a toner image. A transfer unit transfers the toner image onto recording paper. The toner image is then fused into a permanent image in a fixing unit.

In an electrophotographic printer, images such as photographs need to be printed in a halftone printing technique. The resolutions of printed images and methods of halftone printing are highly dependent on the desired maximum halftone value of the dots formed on the photoconductive drum.

FIG. 22 illustrates the relationship between the halftone value and the screen ruling when an image is produced 256 levels of halftone with 1/600 (in.) square pixels. In other words, the higher the levels of halftone are, the finer the screen ruling is, so that printed images have higher resolution.

FIG. 23 illustrates an example of a halftone image printed by a conventional image forming apparatus.

Referring to FIG. 10, when pixels are aligned at 1/600 in. intervals both in the advance direction and in the traversing direction, controlling an amount of energy per pixel allows the size of dot to change in 16 levels, i.e., 16 levels of halftone.

In this case, adjacent pixels in the advance direction and in the traversing direction may be formed at an amount of exposure energy different from each other. The use of a square pixel having an area AR1 allows printing with maximum 16 levels of halftone.

FIG. 24 illustrates another example of a halftone image printed by another conventional image forming apparatus.

If the amount of exposure energy is not regulated, the size of pixels formed on the surface of the photoconductive drum cannot be changed. Thus, the size of dots is only a single fixed one, so that every pixel is expressed in 2 levels of halftone.

In this case, adjacent pixels in the advance direction and in the traversing direction cannot be formed at amounts of exposure energy different from each other. The use of a square area AR2 having pixels in a 4×4 matrix allows printing with 16 levels of halftone. Thus, the halftone image in FIG. 24 has a lower resolution than that in FIG. 23. As described above, a smaller maximum number of levels of halftone provides a lower resolution.

With the aforementioned conventional image-forming apparatus, if the amount of exposure energy is to be regulated in as many levels as the number of halftone values, pixels need to be illuminated for specific time lengths. In other words, a memory area is required for each pixel in which a corresponding strobe time is stored. This increases the cost of an image forming apparatus.

SUMMARY OF THE INVENTION

An object of the invention is to provide an image forming apparatus that solves the drawbacks of the aforementioned conventional image-forming apparatus, improves the resolution of printed images, and reduces the manufacturing cost.

An image forming apparatus includes an inputting section and a dot forming section. Halftone print data of pixels is received through the inputting section. The dot forming section irradiates the charged surface of an image bearing body with light to form a plurality of lines of dots in accordance with the half tone data, wherein dots on a same line have a same exposure energy and dots on different lines in a same pixel have different exposure energies.

The plurality of lines may include as many lines as there are bits in the halftone print data.

The plurality of lines may include a first predetermined number of lines and the halftone print data includes a second predetermined number of bits different from the first predetermined number.

The image forming apparatus further includes a conversion table that converts halftone print data having a first number of bits into corresponding energy data having a second number of bits.

An image forming apparatus includes:

an image bearing body that bears an electrostatic latent image thereon;

a charging member that charges a surface of the image bearing body;

an exposing section having a plurality of light-emitting elements, the exposing section irradiating the charged surface of the image bearing body with light emitted by the light-emitting elements to form an electrostatic latent image;

a developing section that deposits toner to the electrostatic latent image to form a visible image;

a transferring section that transfers the visible image onto a recording medium;

an inputting section through which halftone data is received from an external device; and a controller that controls the exposing section to irradiate the charged surface of the image bearing body with the light in accordance with the n-bit halftone data to form a plurality of lines of dots at different exposure energies.

A combination of the dots formed at different exposure energies represents a halftone value of a pixel.

A combination of dots on different lines of dots form a pixel having a corresponding halftone value.

The dots on the plurality of lines of dots are weighted in terms of exposure energy such that dots on a same line have a same weight and dots on different lines in a same pixel have different exposure energies.

At least one of the plurality of lines is irradiated with a predetermined amount of exposure energy regardless of the halftone data of pixels.

The predetermined amount of exposure energy illuminates the charged surface of the image bearing body at a substantially middle one of the plurality of lines of dots.

The predetermined amount of exposure energy is insufficient to form a dot but is a part of an exposure energies to form a dot on another one of the plurality of lines of dots.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

Embodiments of the invention will be described in detail with reference to the accompanying drawings.

While a description will be given of an electrophotographic printer as an image-forming apparatus, the present invention may also be applied to copying machines, facsimile machines, and the like. By way of example, the electrophotographic printer according to the invention employs an LED head as an exposing unit.

First Embodiment

{Construction}

Figure 1:
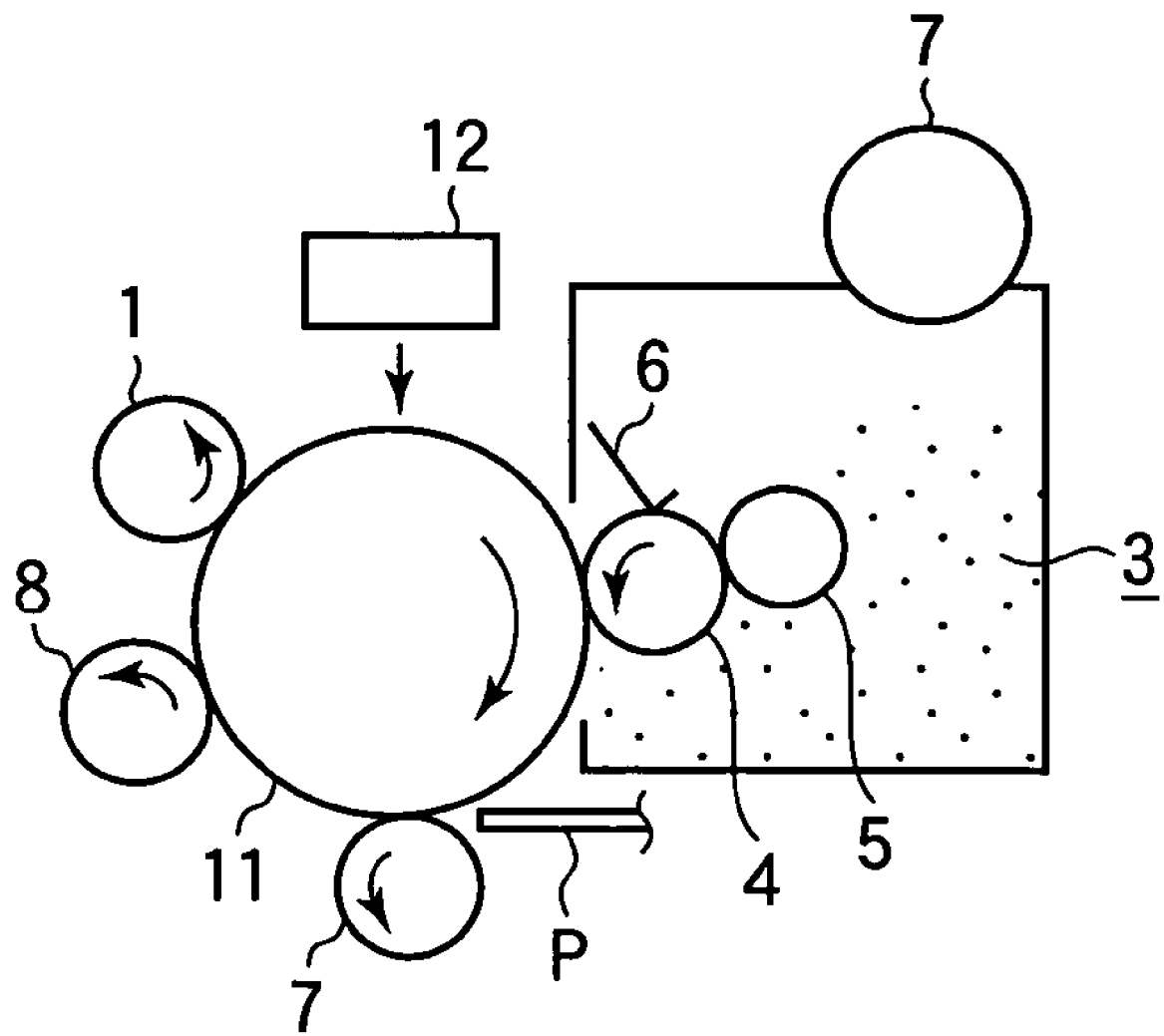
FIG. 1 illustrates a general configuration of an LED printer according to a first embodiment.

FIG. 1 illustrates the general configuration of an LED printer according to a first embodiment.

Referring to FIG. 1, a photoconductive drum 11 is supported rotatably. A charging roller 1 rotates in contact with the photoconductive drum 11 to charge the surface of the photoconductive drum 11 uniformly. An LED head 12 illuminates the charged surface of the photoconductive drum 11 in accordance with data signal DATA received from a print controller 13, thereby forming an electrostatic latent image on the photoconductive drum 11.

A developing unit 3 develops the electrostatic latent image into a toner image. The developing unit includes a developing roller 4, a sponge roller 5, a developing blade 6, and a toner cartridge 7. The developing roller 4 rotates in contact with the photoconductive drum 11 to apply toner to the electrostatic latent image. The sponge roller 5 is formed of a resilient material and rotates in contact with the developing roller to supply the toner to the developing roller. The developing blade 5 forms a thin layer of toner on the developing roller 4. The toner cartridge 7 holds the toner therein.

A transfer roller 7 rotates in contact with the photoconductive drum 11 to transfer the toner image onto paper P. The paper advances to a fixing unit, not shown, in which the toner image is fused by heat and under pressure. A cleaning roller 8 rotates in contact with the photoconductive drum 11 to remove the residual toner remaining on the photoconductive drum 11 after transfer.

Figure 2:
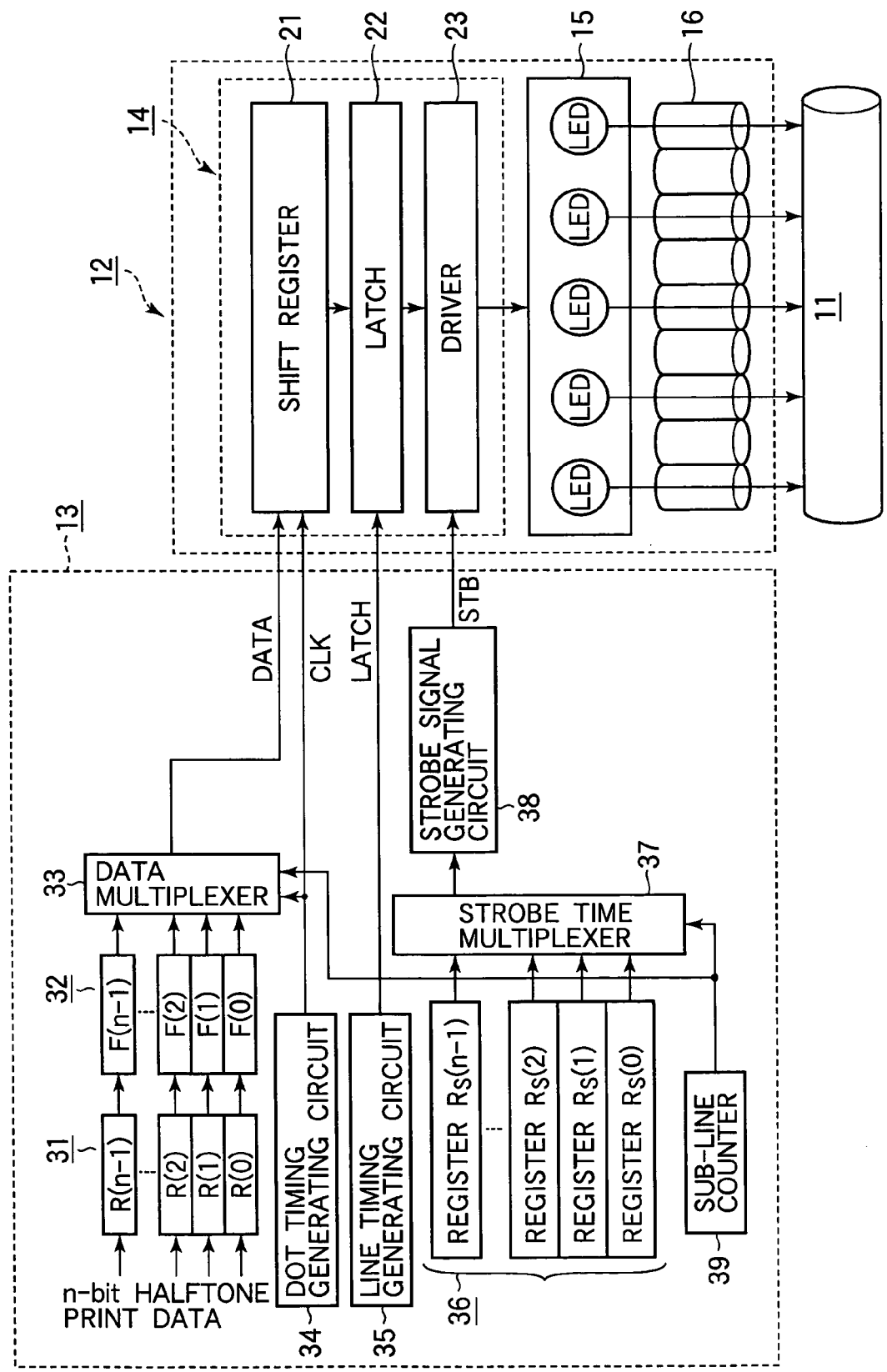
FIG. 2 is a block diagram illustrating a general configuration of an LED printer according to the first embodiment.

FIG. 2 is a block diagram illustrating the general configuration of the LED printer according to the first embodiment.

The LED head 12 includes, for example, a driver chip 14, an LED array 15, and a rod lens array 16. The rod lens array 16 focuses the light, emitted from the respective LEDs, on the surface of the photoconductive drum 11. The driver chip 14 includes a shift register 21, a latch 22, and a driver 23 formed of a plurality of NAND gates, not shown.

The print controller 13 sends the data signal DATA in serial data form to the shift register 21 in synchronism with a clock signal CLK. The shift register 21 outputs the data signal DATA in parallel data form to the latch 22, which in turn outputs the parallel data to the driver 23.

During a high level period of a strobe signal STB, the NAND gates in the driver 23 output a logic "High" if they receive data signal DATA of a logic "High" from the latch 22. The logic "High" causes current to flow through a corresponding LED so that the LED emits light.

The print controller 13 receives print data from, for example, a host computer, not shown, the print data having a pixel with a maximum halftone value expressed by n bits, i.e., n-bit halftone data.

Figure 3:
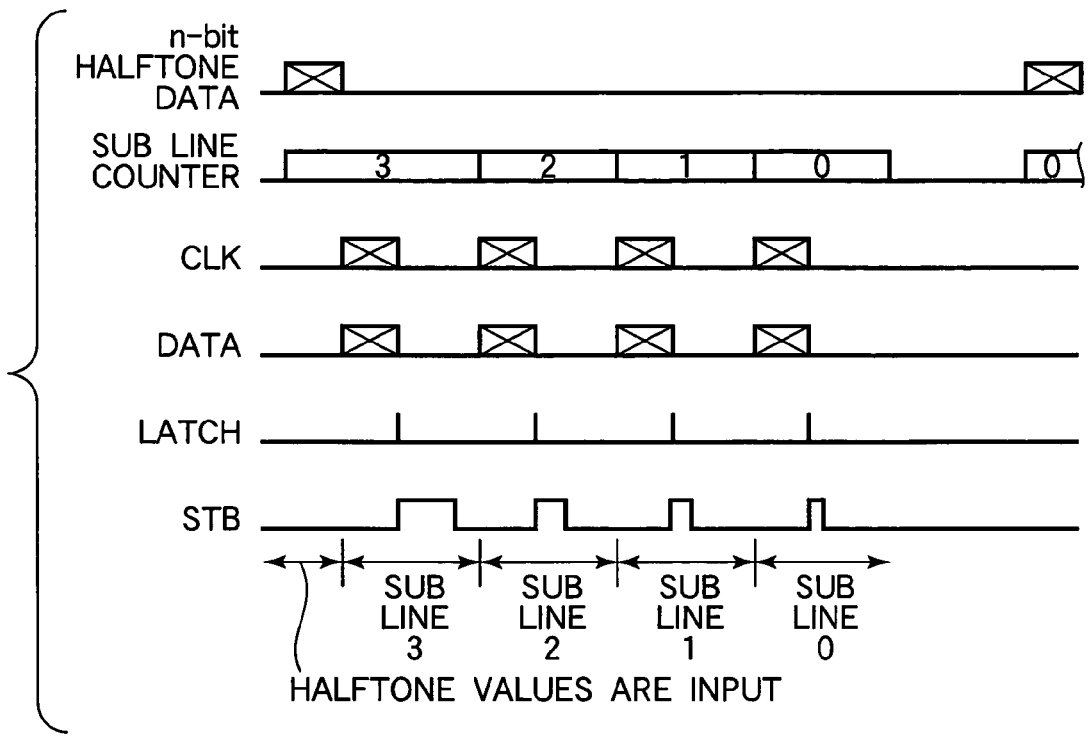
FIG. 3 is a timing chart illustrating the operation of the LED printer.

FIG. 3 is a timing chart illustrating the operation of the LED printer.

Figure 4:
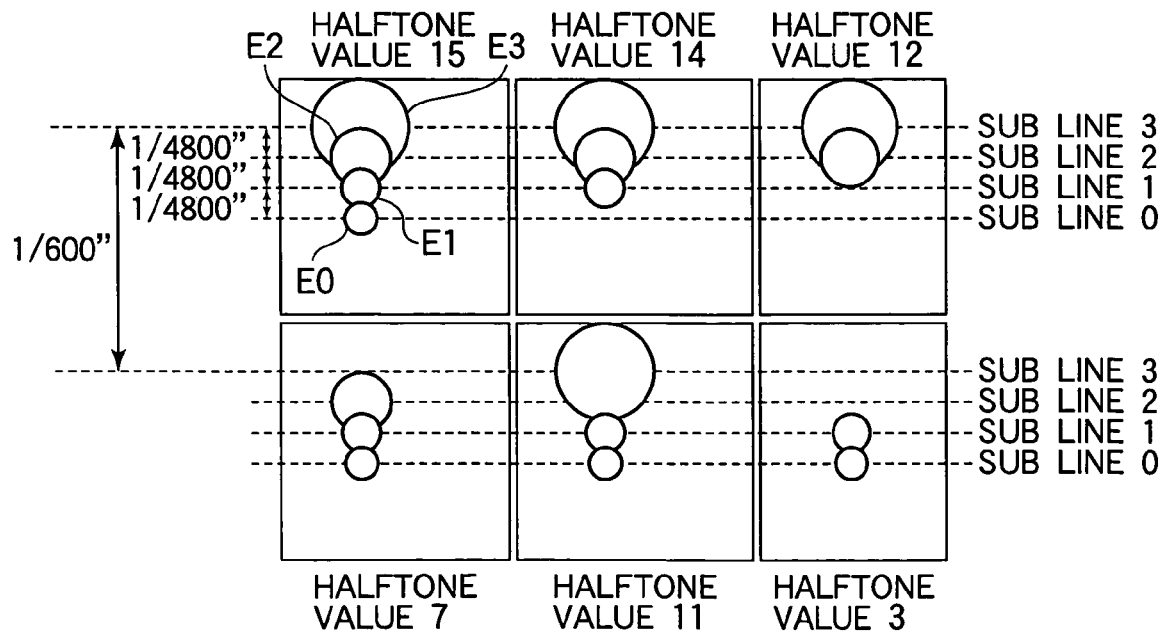
FIG. 4 illustrates pixels having a variety of halftone values.

FIG. 4 illustrates pixels having a variety of halftone values. For simplicity's sake, the halftone data for pixels in FIGS. 3 and 4 is 4-bit data that produces 16 levels of halftone. Each pixel area formed on the photoconductive drum 11 has a square shape of a size of 1/600 in.×1/600 in. As the photoconductive drum 11 rotates, the LED head 12 illuminates the photoconductive drum 11 to form pixels at four sub-line timings, which will be described later in detail.

One line includes four sub-lines which are aligned in the advance direction and extend in traversing direction. When pixels are aligned at 1/600 in. intervals both in the advance direction and in the traversing direction, there are n sub-lines aligned at 1/4800 in. intervals in the advance direction. In the first embodiment, there are four sub-lines, i.e., sub-line 0 to sub-line 3. The LED head 12 illuminates the surface of the photoconductive drum 11 at exposure energies of E0 to E3, thereby forming each pixel having a maximum of four sub-dots positioned on the sub-lines 0 to 3. Thus, the exposure energy E for a pixel is the sum of exposure energies E0 to E3. The sub-dots are formed at the same amount of energy on a corresponding one of the plurality of lines and at different amounts of energy from line to line. Assuming that the P pj (pico joule) is an amount of energy necessary for one pixel having a highest halftone value, each of the sub-lines is assigned exposure energy given by $2^s \times U$ pj where U is a value obtained by dividing P pj by the largest number expressed by the number of sub-lines s (s=3, 2, 1, 0). Thus, the highest exposure energy for one pixel, i.e., exposure energy for halftone value 15 in FIG. 4 is $(2^3+2^2+2^1+2^0) \times U = P = 16$ U pj.

As is clear from in FIG. 4, each pixel has a halftone value expressed by a combination of a plurality of sub-dots in a corresponding pixel area, the sub-dots being aligned in the advance direction.

Sub-dots in sub-lines 0 to 3 are exposed to the exposure energies E0 to E3, respectively, the exposure energies E0 to E3 being different from one another. Sub-dots on the same sub-line are formed by irradiating corresponding dot areas with light for the same length of strobe time. In other words, the dots on the same sub-line are formed at the same amount of exposure energy. As shown in FIG. 4, forming sub dots on the sub-lines 0 to 3 achieves a halftone value "15" and forming sub dots on the sub-lines 1-3 achieves a halftone value "14", and forming sub dots on the sub-lines 2-3 accomplishes a halftone value "12". Likewise, forming sub dots on the sub-lines 0-2 enables a halftone value "7", forming sub dots on the sub-lines 0, 1 and 3 achieves a halftone value "11", and forming sub-dots on the sub-lines 0 and 1 achieves a halftone value "3".

For achieving the respective halftone values in FIG. 4, the print controller 13 includes a halftone value register bank 31, a binary sub-line buffer bank 32, a data multiplexer 33, a dot timing generating circuit 34, a line timing generating circuit 35, a strobe time register bank 36, a strobe time multiplexer 37, a strobe signal generating circuit 38, and a sub-line counter 39. The halftone value register bank 31 has an input port having n registers Ri(i=0, 1, 2 ..., n−1). The binary sub-line buffers 32 is provided with n sub-line buffers F(i) (i=0, 1, 2, 3 ..., n−1) that store the data for the sub-lines 0 to 3. The data multiplexer 33 sends the data signal DATA to the LED head 12. The dot timing generating circuit 34 generates a clock signal CLK. The line timing generating circuit 35 generates a latch signal LATCH. The strobe signal generating circuit 38 generates a strobe signal STB. The sub-line counter 39 switches the n sub-lines (i) (i=0, 1, 2, and 3) from one to another.

The operation of the LED printer according to the first embodiment will now be described with reference to the timing chart in FIG. 3.

When the sub-line counter 39 counts to n−1, the bits of n-bit halftone data for one line are input into the respective registers R(i) of the halftone value register bank 31 in order, and the bits of the bit data B(i) (i=0, 1, 2, ..., n−1) for one line are outputted from the respective registers R(i) and are written into the sub-line buffers F(i) (i=0, 1, 2, ..., n−1) in order. In this manner, the n-bit halftone data for one line is received into the registers R(i), and concurrently the bit data B(i) for one line is stored into the sub-line buffers F(i).

Exposure of sub-line (i) is performed as follows:

Initially, the count of the sub-line counter 39 is n−1. Thus, the multiplexer 33 sends bit data B(i=n−1) stored in the sub-line buffer F(i=n−1), i.e., data signal DATA to the shift register 21, which in turn receives the data signal DATA in synchronism with the clock signal CLK generated by the dot timing generating circuit 34.

Once the shift register 21 has received all bits of data signal DATA for one line, the line timing generating circuit 35 sends the latch signal LATCH to the latch 22 in the driver chip 14 and the latch 22 receives the data signal DATA in parallel data form.

The strobe time register bank 36 includes registers Rs(i) (i=0, 1, 2, ..., n−1). Each of the registers Rs(i) stores a strobe time t(i) (i=0, 1, 2, ..., n−1) that represents a corresponding amount of exposure energy E(i) (i=0, 1, 2, ..., n−1) assigned to a corresponding sub-line (i) (i=0, 1, 2, ..., n−1).

Because the count of the sub-line counter 39 is n−1, the strobe time t(i=n−1) stored in the register Rs(i=n−1) that corresponds to sub-line 0 is sent to the strobe signal generating circuit 38 via the strobe time multiplexer 37. The strobe signal generating circuit 38 generates a strobe signal STB that corresponds to the strobe time t(i=n−1), the strobe signal STB being sent to the driver 23 in the LED head 12.

As a result, high-level bits of the parallel data sent from the latch 22 cause corresponding LEDs to be energized during the strobe signal STB, so that the energized LEDs emit light having an exposure energy of E(i=n−1). In this manner, exposure is carried out for the sub-line n−1.

Then, when the sub-line counter 39 counts down to "n−2", the sub-line buffer F(i=n−2) outputs the bit data B(i=n−2) in serial data form, i.e., the data signal DATA for one line to the LED head 12 in synchronism with the clock signal CLK, so that the bit data B(i=n−2) is written into the shift register 21.

Once all bits of the data signal DATA have been written into the shift register 21, the line timing generating circuit 35 sends the latch signal LATCH to the latch 22 of the driver chip 14, the latch 22 receiving the data signal DATA in parallel data form.

Because the count of the sub-line counter 39 is "n−2", the strobe time t(i=n−2) stored in the register Rs(i=n−2) that corresponds to sub-line n−2 is sent to the strobe signal generating circuit 38 via the strobe time multiplexer 37. The strobe signal generating circuit 38 generates a strobe signal STB that corresponds to the strobe time t(i=n−2), the strobe signal STB being sent to the driver 23 in the LED head 12.

As a result, high-level bits of the parallel data sent from the latch 22 cause corresponding LEDs to be energized during the strobe signal STB, so that the energized LEDs emit light having an exposure energy of E(i=n−2). In this manner, exposure is carried out for sub-line n−2.

Likewise, exposure is carried out for the sub-lines 2, 3, ..., n−1, thereby completing the exposure for forming dots for one line.

Then, the count of the sub-line counter 39 is reset to "n−1", and n-bit halftone data for the next line is input into the respective registers R(i) of the halftone value register bank 31. In this manner, sub-dots on the respective sub-lines (i) are formed under the control of the print controller 13.

When exposure is performed to form a pixel having a predetermined halftone value expressed by the n-bit halftone data, the respective sub-lines (i) are subjected to exposure in order. The exposure energy E is given by the following equation.

$$E = \sum_{i=0}^{n-1} B(i) \cdot t(i) \cdot W$$

where E is exposure energy for a pixel, W is an amount of light per unit time that is emitted from a corresponding LED, and t is a time length during which the corresponding LED is driven.

Thus, dot areas on the photoconductive drum 11 is irradiated with light to form a pixel having a predetermined halftone value, the strobe time t(i) can be selected in accordance with the exposure energy E required.

Defining n sub-lines (i) (i=0, 1, 2, ... n−1) and providing n sub-line buffers F(i) (i=0, 1, 2, ... n−1) allow each pixel to be expressed in one of $2^n$ levels of halftone, thereby improving resolution by using a relatively small number of sub-lines (i) (i=0, 1, 2, ... n−1).

As described above, the respective sub-line (i) is assigned a corresponding strobe time t(i). Thus, in order to change the exposure energy E in as many levels as the number of levels of halftone, it is not necessary to assign values of strobe time t(i) on a pixel-to-pixel basis. This eliminates the need for providing a memory area for each one of pixels that would otherwise hold a strobe time, thereby reducing the cost of the image forming apparatus.

Second Embodiment

Figure 5A:
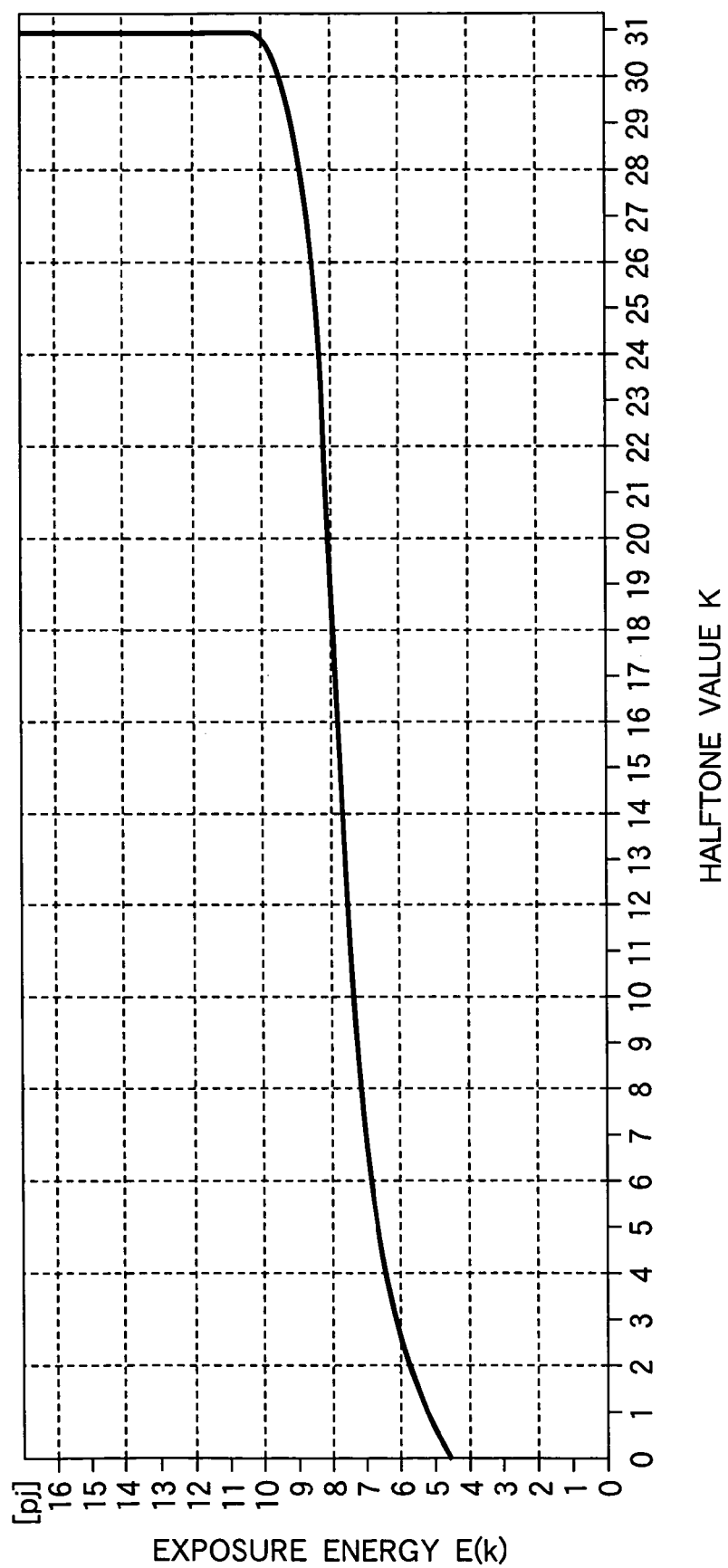
FIG. 5A illustrates the relationship between halftone value and exposure energy for an LED.

FIG. 5A illustrates the relationship between halftone value and exposure energy for an LED when eight sub-lines are used.

Referring to FIG. 5A, the relation between the halftone value K and the exposure energy E(k) is non-linear. The non-linear relation between the halftone value K and the exposure energy E(k) is caused by a plurality of factors including the photo-induced discharge characteristic (i.e., photo sensitivity) of the photoconductive drum 11 and the amount of charge that toner particles acquire. Thus, when such a non-linear relation between the halftone value K and the exposure energy E(k) is used, it is essential to accurately control the exposure energy E(k).

Referring to FIG. 5A, the halftone value K abruptly changes near E(k)=8 pj (pico joule) and saturates near E(k)= 10 pj, reaching a maximum halftone value. Calculation can be made to determine an amount of exposure energy necessary for creating a change in exposure energy E(k) enough for one increment of halftone value (referred to as "energy increment" hereinafter) in the region where a small change in exposure energy causes a large change in halftone value. Also, calculation is required to determine an amount of exposure energy necessary for achieving a maximum density (referred to as maximum energy hereinafter).

For example, from FIG. 5A, an exposure energy of 8.2 pj is required to produce a halftone value of 22 and an exposure energy of 8 pj is required to produce a halftone value of 18.

Thus, exposure energy per unit increment of halftone value is given by (8.2 −8)/(22−18)=0.05 pj. Thus, the graph in FIG. 5A shows that the energy increment should be 0.05 pj or less in order to achieve accurate control of exposure energy for appropriate settings of halftone values.

In other words, the more precisely the exposure energy needs to be controlled, the larger the number of sub-lines are required. Thus, in FIG. 5A, an energy increment of 0.05 pj or less enables exposure energy E(k) from 0 to 10 pj to be controlled in 200 levels. Exposure energies from 0 to 4.5 pj are not enough to produce any halftone value and therefore not used. Exposure energies from 4.5 pj to 10 pj can be used to achieve halftone values 0-31. Thus, controlling exposure energy in 200 levels provides accurate halftone values from 0-31. Controlling exposure energy in 200 levels requires 8 sub-lines, which is more than the number of bits of the 4-bit halftone data.

Figures 5B, 5C:
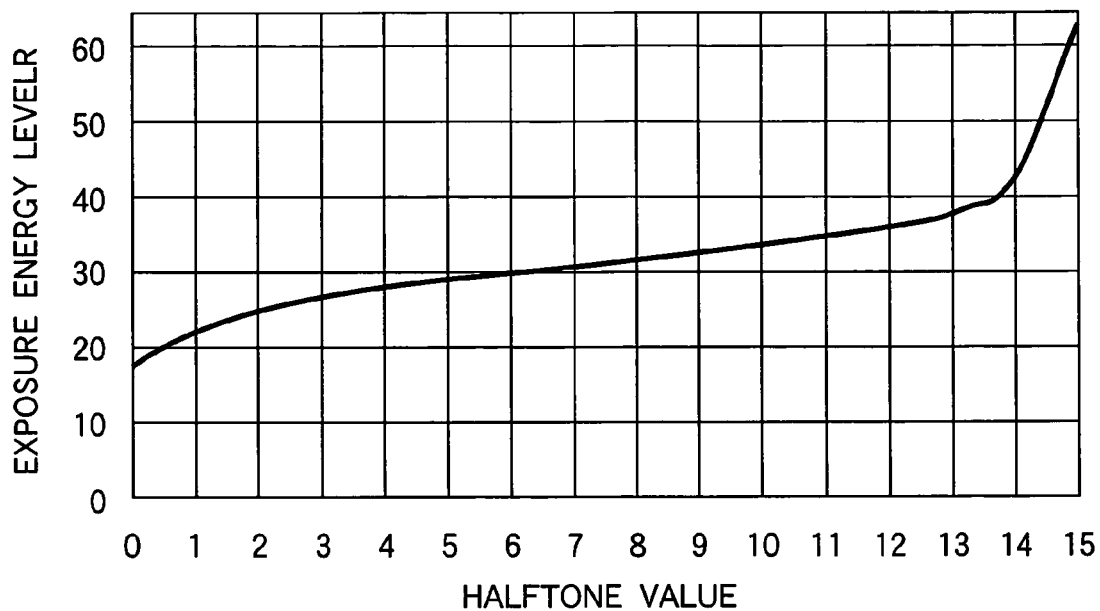
FIG. 5B illustrates the relationship between halftone value and exposure energy for an LED when six sub-lines are used.
FIG. 5C illustrates the relationship between halftone values and exposure energies for sub-lines 0-5.

FIG. 5B illustrates the relationship between halftone value and exposure energy for an LED when six sub-lines are used.

FIG. 5C illustrates the relationship between halftone values and exposure energies for sub-lines 0-5.

For simplicity's sake, the second embodiment will be described in terms of 6 sub-lines for 4-bit halftone data. Exposure energy level is represented in terms of values expressed by six sub-lines. Exposure energy levels 32, 16, 8, 4, 2, and 1 are assigned to sub-lines 5, 4, 3, 2, 1, and 0, respectively. For example, when dots are formed on sub-line 5 and sub-line 2, the exposure energy level is 32+4=36, which gives a halftone value of 12.

In a second embodiment, the number of sub-lines is greater than the number of bits of the n-bit halftone data. Elements similar to those in the first embodiment have been given the same reference numerals and the description thereof is omitted.

Figure 6:
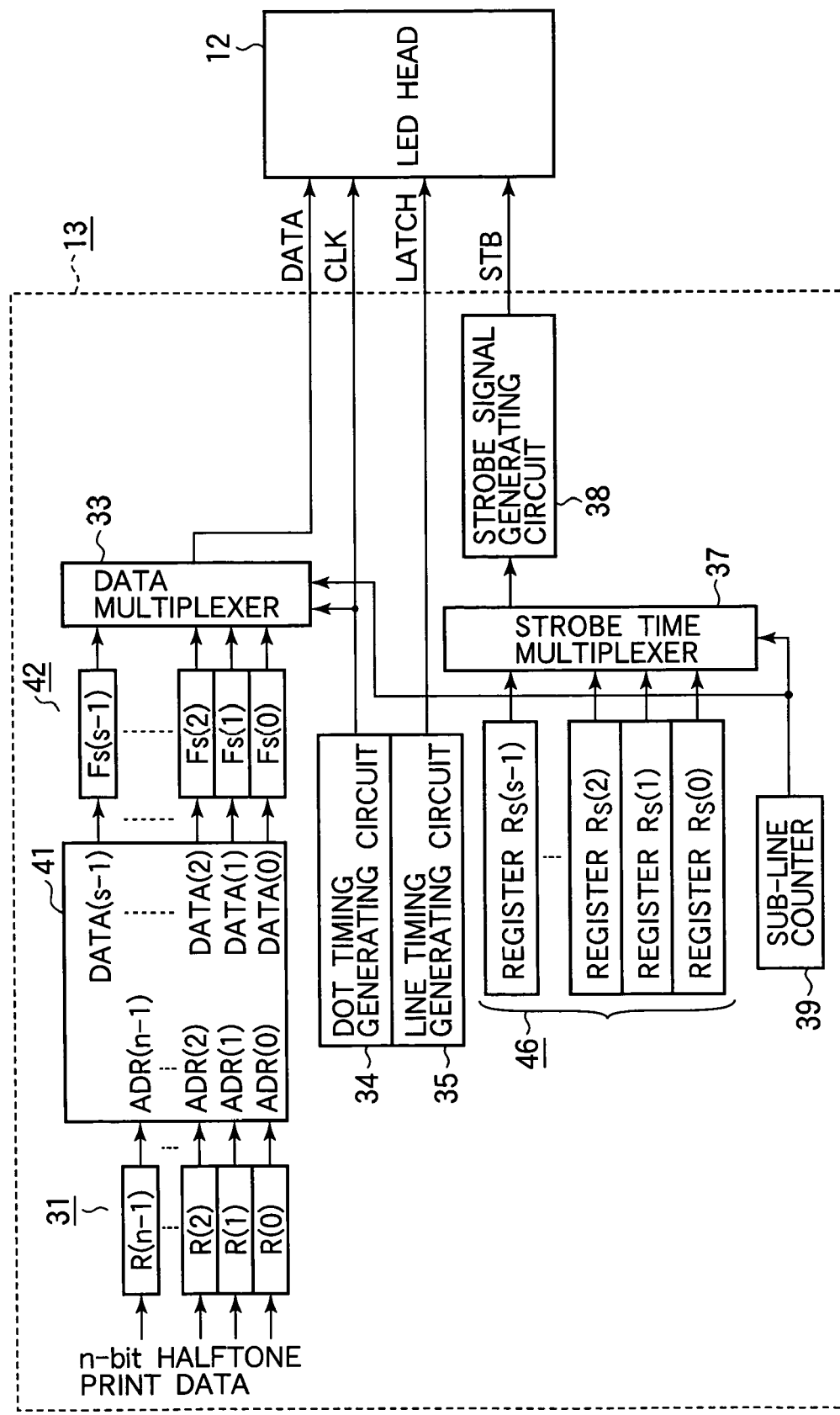
FIG. 6 is a block diagram illustrating an LED printer according to a second embodiment.

FIG. 6 is a block diagram illustrating the configuration of an LED printer according to the second embodiment.

The print controller 13 receives n-bit halftone data from a host apparatus such as a host computer, not shown, the n-bit halftone data describing the half tone values of each pixel. In the second embodiment, the print controller 13 receives 4-bit halftone data and therefore the density of a pixel is expressed in 16 levels of halftone. A pixel formed on the photoconductive drum 11 has a square shape having a size of 1/600 (in.)×1/600 (in.). When the photoconductive drum 11 rotates relative to the LED head 12, 6 sub-line timings for forming dots on the 6 sub-lines are generated, so that the LED head 12 illuminates dot areas on the 6 sub-lines on the photoconductive drum 11 in accordance with the data signal DATA.

When pixels are aligned at 1/600 in. intervals both in the advance direction and in the traversing direction, there are s sub-lines aligned in the advance direction and therefore s dot-areas aligned at 1/4800 in. intervals in the advance direction. In the present embodiment, there are 6 sub-lines, i.e., sub-line 0 to sub-line 5, and 6 dot-areas aligned at 1/4800 in intervals. The LED head 12 irradiates the surface of the photoconductive drum 11 with light at exposure energies of Es0 to Es5, thereby forming a pixel having four sub-dots positioned on the corresponding sub-lines 0 to 5. Thus, the exposure energy E for a pixel is the sum of exposure energies Es0 to Es5. The exposure energy is the same for the same sub-line but differs from sub-line to sub-line. In FIG. 6, the size of circles indicates the magnitude of exposure energy. The higher the exposure energy, the longer time length the area of the rotating photoconductive drum 11 is irradiated. Thus, the longer the rotating photoconductive drum is irradiated, the larger the dot is formed on the photoconductive drum 11.

Figure 7:
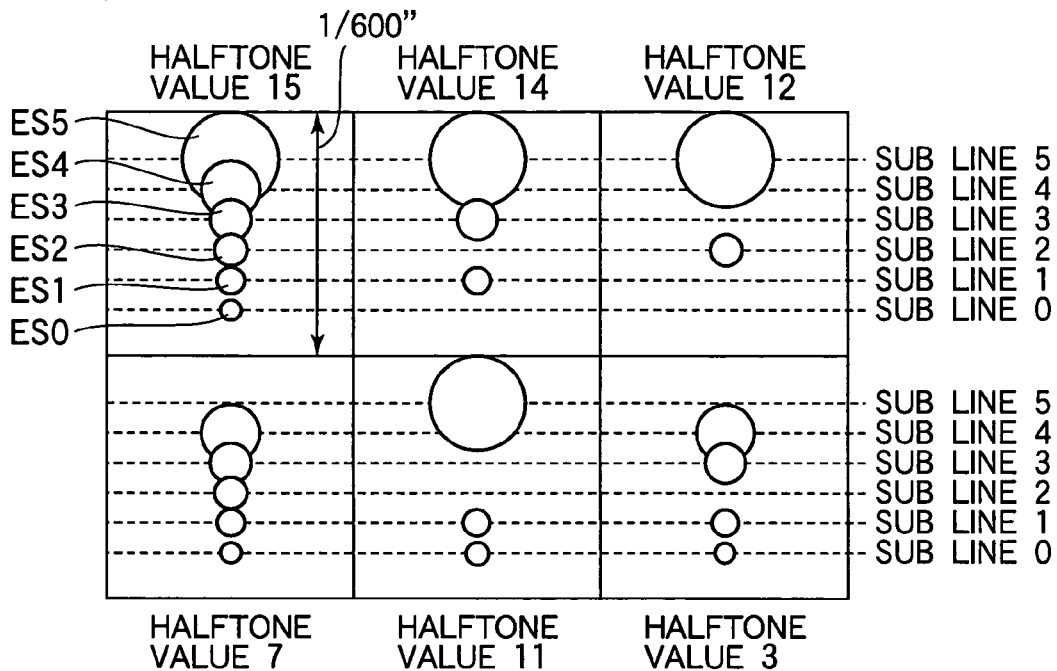
FIG. 7 illustrates pixels of a variety of halftone values.

FIG. 7 illustrates pixels of a variety of halftone values. For simplicity's sake, the halftone data for pixels in FIG. 7 is 4-bit data and 6 sub-lines are used instead of 4 sub-lines.

Each pixel has a halftone value expressed by a combination of a plurality of sub-dots in each pixel area, the plurality of sub dots being aligned in the advance direction.

Sub dots on sub-lines 0 to 5 are exposed to the exposure energies Es0 to Es5, respectively, the exposure energies Es0 to Es5 being different from one another. Sub-dots on the same sub-line are formed by irradiating corresponding dot areas with light for the same length of strobe time. In other words, the dots on the same sub-line are formed at the same amount of exposure energy. Thus, as shown in FIG. 7, forming sub dots on the sub-lines 0-5 achieves a halftone value "15"and forming sub dots on the sub-lines 0-2 and 5 achieves a halftone value "14", and forming sub dots on the sub-lines 0, 1, and 4 accomplishes a halftone value "12". Likewise, forming sub dots on the sub-lines 1-3 and 5 achieves a halftone value "7", forming sub dots on the sub-lines 0 and 2-4 achieves a halftone value "11", and forming sub-dots on the sub-lines 2, 3, and 5 achieves a halftone value "3".

For achieving the respective halftone values in FIG. 7, the print controller 13 includes a halftone value-to-energy conversion table 41 in the form of an SRAM. The halftone value-to-energy conversion table 41 is located between a halftone value register bank 31 and a binary sub-line buffer bank 42 that operates as a sub-line memory. The halftone value-to-energy conversion table 41 lists n-bit halftone data and a corresponding amount of energy expressed in s bits.

Figure 8:
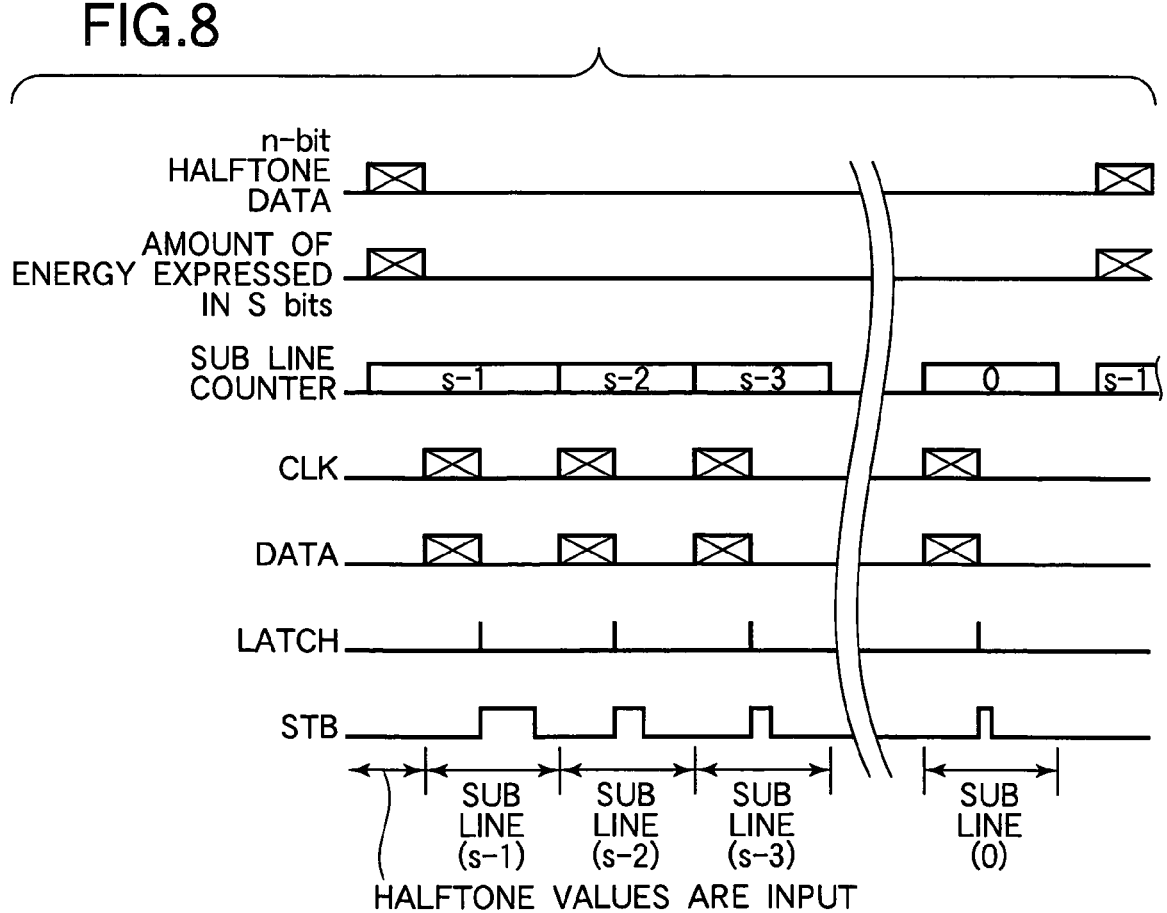
FIG. 8 is a timing chart illustrating the operation of an LED printer according to the second embodiment.

FIG. 8 is a timing chart illustrating the operation of the LED printer according to the second embodiment.

The operation of the LED printer according to the second embodiment will now be described with reference to the timing chart in FIG. 8.

When the sub-line counter 39 is set to n−1, the bits of n-bit halftone data are input into the respective registers R(i) of the halftone value register bank 31 in order, and the bits of bit data B(i) (i=1, 2, . . . , n−1) are outputted from the respective registers R(i) and written into address ADR(i) (i=0, 1, 2, . . . , n−1) of the halftone value-to-energy conversion table 41. The bit data B(i) is converted into data signal DATA(j) (j=0, 1, . . . , s−1) expressed in s bits, which in turn is outputted to the binary sub-line buffer bank 42.

The LED printer is operated to obtain the relationship between the halftone values and exposure energies for LEDs in FIG. 5A. Then, the data signal DATA(j) is calculated based on the energy increment and the maximum energy.

The binary sub-line buffer bank 42 includes s sub-line buffers Fs(j) (j=0, 1, . . . , s−1) into which the respective data signal DATA(j) received from the halftone value-to-energy conversion table 41 is written in order. Once the n-bit halftone data for one line has been received, the data signal DATA(j) for one line is stored into the respective sub-line buffers Fs(j).

Exposure of the sub-line (j) will be described.

Because the count of the sub-line counter 39 is s−1, the data multiplexer 33 sends the data signal DATA for one line, i.e., the data signal DATA (j=s−1) stored in the sub-line buffer Fs(s−1) to the LED head 12 in synchronism with the clock signal CLK generated by the dot timing generating circuit 34, so that the data signal DATA for one line is written into the shift register 21 in the LED head 12.

Once all bits of data signal DATA have been written into the shift register 21, the line timing generating circuit 35 sends the latch signal LATCH to the latch 22 in the driver chip 14, so that the latch 22 receives the data signal DATA in parallel data form.

The strobe time register bank 46 includes registers Rs(j) (j=j=0, 1, 2, . . . , s−1). Each of the registers Rs(i) stores a strobe time ts(j) (j=0, 1, 2, . . . , s−1) that represents a corresponding amount of exposure energy Es(j) (j=0, 1, 2, . . . , s−1) assigned to the sub-lines 0 to s−1, respectively.

Because the count of the sub-line counter 39 is s−1, the strobe time ts(j=0) stored in the register Rs(j=s−1) that corresponds to sub-line s−1 is sent to the strobe signal generating circuit 38 via the strobe time multiplexer 37. The strobe signal generating circuit 38 generates a strobe signal STB that corresponds to the strobe time ts(j=s−1), the strobe signal STB being sent to the LED head 12 and then input into the driver 23 in the LED head 12.

As a result, high-level bits of the data signal DATA in parallel data form sent from the latch 22 cause corresponding LEDs to be energized during the strobe signal STB, so that the energized LEDs emit light having an exposure energy of Es(j=s−1). In this manner, exposure is carried out for the sub-line s−1.

When the sub-line counter 39 counts down to s−2, the sub-line buffer Fs(j=s−2) outputs the data signal DATA for one line, i.e., the bit data B(j=s−2) in the serial data form to the LED head 12 in synchronism with the clock signal CLK, so that the bit data B(j=s−2) is written into the shift register 21 in the LED head 12.

Once all bits of data signal DATA have been written into the shift register 21, the line timing generating circuit 35 sends the latch signal LATCH to the latch 22 in the driver chip 14, so that the latch 22 receives the data signal DATA in parallel data form.

Because the count of the sub-line counter 39 is s−2, the strobe time ts(j=s−2) stored in the register Rs(j=s−2) that corresponds to sub-line s−2 is sent to the strobe signal generating circuit 38 via the strobe time multiplexer 37. The strobe signal generating circuit 38 generates a strobe signal STB that corresponds to the strobe time ts(j=s−2), the strobe signal STB being sent to the driver 23.

As a result, high-level bits of the parallel data sent from the latch 22 cause corresponding LEDs to be energized during the strobe signal STB, so that the energized LEDs emit light having an amount of exposure energy of Es(j=s−2). In this manner, exposure is carried out for the sub-line s−2.

Likewise, exposure is carried out for the sub-lines 2, 3, . . . , s−1, thereby completing the exposure for forming dots for one line.

Then, the count of the sub-line counter 39 is set to s−1 again, and n-bit halftone data for the next line is input into the respective registers R(i) of the halftone value register bank 31. In this manner, sub-dots on the respective sub-line (i) for the next line are formed under the control of the print controller 13.

When the halftone value-to-energy conversion table 41 converts the n-bit halftone data into an amount of energy Es(k) expressed in s bits, the following relation exists, $$Es(k) = E(k)/\epsilon$$

where E(k) is the exposure energy for a halftone value k and ϵ is the maximum energy.

By converting the Es(k) into binary form, data signal DATA(j) is obtained as follows:

$$DATA(j) = B(Es(k))$$
$$= B(E(k)/\varepsilon)$$

If an LED emits an amount of light W per unit time and is to emit a total amount of energy equal to an energy increment ε in a time length t, then w·t=ε. In other words, the LED needs to be driven for a time length t=ε/w. Thus, the strobe time required for irradiating the j-th sub-line is ts(j)=$2^j$·ε/w.

In this manner, the respective sub-lines are exposed to light for a time length ts(j) in accordance with the data signal DATA(j). The exposure energy Es(j) for producing a sub dot on the j-th sub-line is given by $$Es(j) = DATA(j) \cdot ts(j) \cdot w$$
$$= B(E(k)/\varepsilon) \cdot (2^j \cdot \varepsilon/w) \cdot w$$
$$= B(E(k)) \cdot 2^j$$

The exposure energy Es which is the sum of the exposure energy Es(j) for producing sub dots is given by $$Es = \sum_{j=0}^{s-1} \{B(E(k)) \cdot 2^j\}$$

In this manner, the strobe time ts(j) is calculated based on the characteristic of the individual LEDs, so that each LED is driven at an appropriate exposure energy Es(j) in accordance with, for example, the amount of charge to be deposited on the toner particles and photo-induced discharge characteristic of the photoconductive drum 11.

Even if changes occur in the photo-induced discharge characteristic of the photoconductive drum 11 and the amount of charge deposited on the toner particles, it is only necessary to update the halftone value-to-energy conversion table 41. This allows the LEDs to be driven at an appropriate exposure energy Es(j), providing images with optimum density.

In the second embodiment, the halftone value register bank 31 incorporates the respective registers R(i) that store corresponding halftone data. Instead of employing the halftone value register bank 31, a buffer may be used to store the n-bit halftone data for one line.

Third Embodiment

{Construction}

Conventional LED printers employ a strobe time of about several tens microseconds. The strobe time for a conventional LED head can be readily changed, if necessary. For simple and easy correction of print density, the strobe time is commonly changed by, for example, ±10%, ±20%, or ±30%, thereby adjusting the print density to the user's preference.

The halftone printing in the present invention involves as many lengths of strobe time as there are sub-lines. Moreover, the shortest strobe time is about 100 ns, which is difficult to accurately adjust. Thus, in the third embodiment, a user inputs a desired value of print density from an operation panel, not shown, into the correction coefficient register 48. The print density is adjusted to the user's preference by converting the halftone data into exposure energy.

Figure 9:
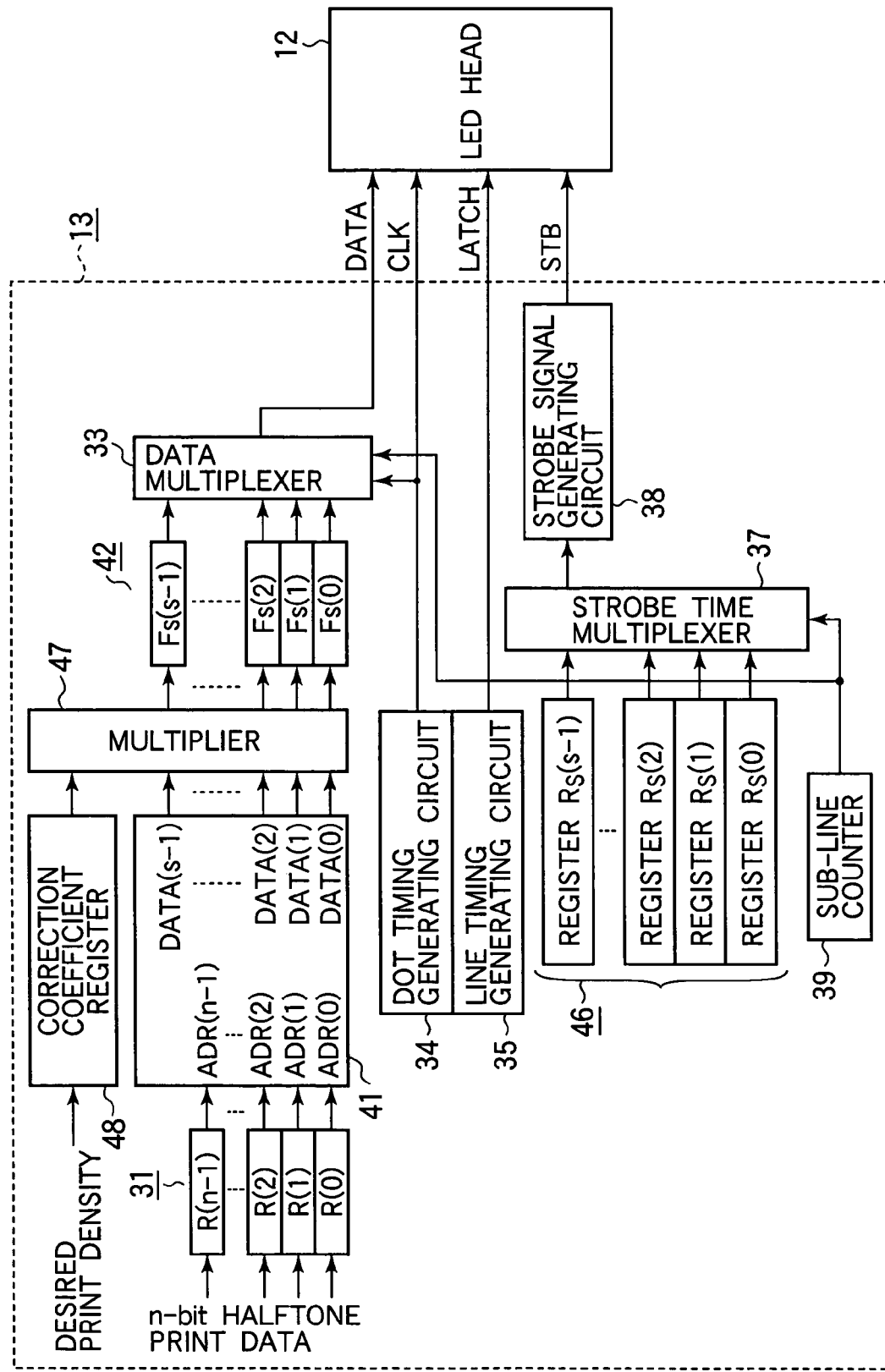
FIG. 9 illustrates a general configuration of the third embodiment.

FIG. 9 illustrates a general configuration of a third embodiment. The third embodiment differs from the second embodiment in that a multiplier 47 and a correction coefficient register 48 are incorporated.

Referring to FIG. 9, the multiplier 47 is provided between the halftone value-to-energy conversion table 41 and the binary sub-line buffer bank 42. The multiplier 47 receives a correction coefficient from the correction coefficient register 48 and DATA(s) (s=0, 1, 2, ..., s−1) from the halftone value-to-energy conversion table 41. Then, the multiplier 47 outputs a product of the correction coefficient and the DATA(s) to the binary sub-line buffer bank 42.

{Operation}

Figure 10A:
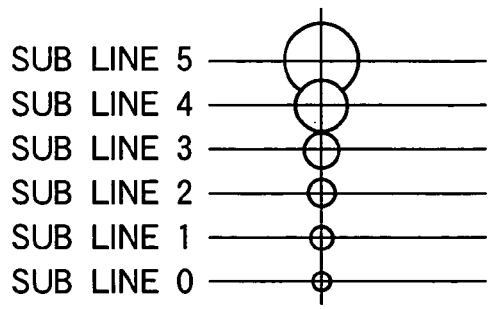
FIG. 10A illustrates a halftone value "64"
Figure 10B:
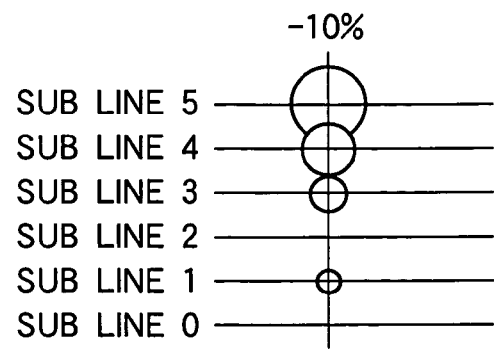
FIG. 10B illustrates a halftone value "58" achieved by multiplying the halftone value in FIG. 10A.

FIG. 10A illustrates a halftone value of "64" and FIG. 10B illustrates a halftone value of "58".

The user inputs a desired print density from the operation panel into the correction efficient register 48. The multiplier 47 takes a product of the desired print density and data signal DATA(i).

For example, if all of sub-lines 0-5 have dots, then the halftone value is "64". If the user inputs a desired print density of −10%, then the halftone value is 64×0.9=57.6, which is about "58" so that dots should be formed on sub-lines 5, 4, 3 and 1. In this manner, the multiplication is performed for each halftone value. Halftone values greater than "64" after multiplication are all set to "64." Printing is then performed in the same manner as the first and second embodiments.

Fourth Embodiment

A fourth embodiment is featured in that a substantially middle line of a total of s−1 sub-lines is irradiated with a light beam having "critical energy", which will be described in detail.

Figure 11:
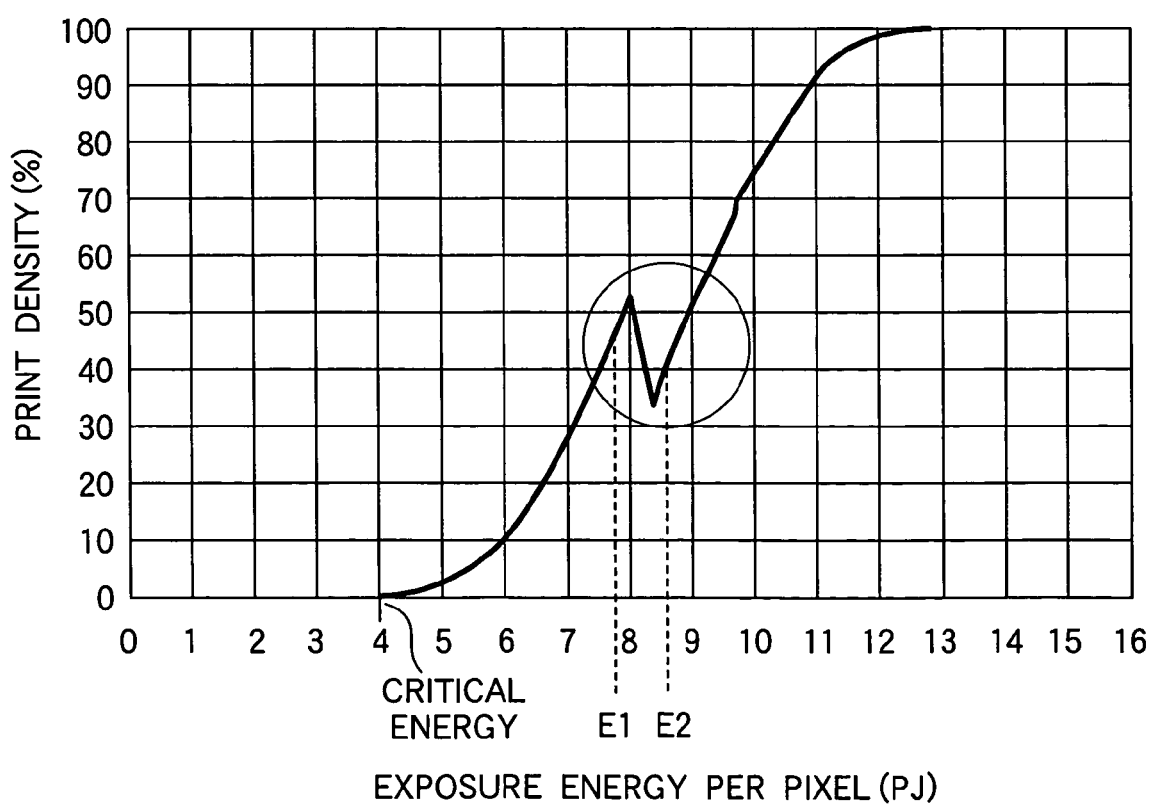
FIG. 11 illustrates an example of the relation between exposure energy and the print density when halftone values are multiplied by a desired coefficient to adjust the density of an image.

If a pixel is formed of a combination of a plurality of beams having different exposure energies, the resultant relation between exposure energy and the print density may not be linear. In other words, the print density drops suddenly in the middle of the curve as shown in FIG. 11. The following is an example of occurrence of a sudden drop in print density.

FIG. 11 illustrates an example of the relation between exposure energy and the print density when halftone values are multiplied by a desired coefficient to adjust the density of an image.

Figure 12A:
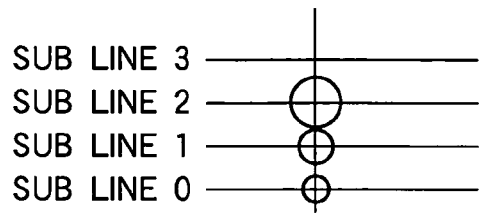
FIG. 12A illustrates a halftone value "7"
Figure 12B:
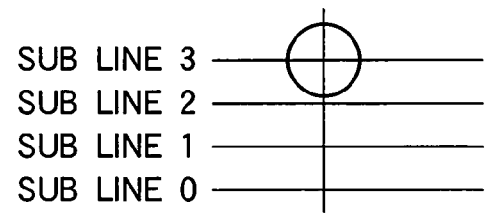
FIG. 12B illustrates a halftone value "8"

FIG. 12A illustrates a halftone value "7" and FIG. 12B illustrates a halftone value "8". A sudden drop in print density can occur when the density of a pixel changes, for example, from the halftone value "7" in FIG. 12A to the halftone value "8" in FIG. 12B.

Referring to FIG. 11, it is assumed that the print density in FIG. 11 is based on 16 levels of halftone. Thus, an exposure energy E1 in FIG. 11 yields a target halftone value of about "7". For example, in an attempt to correct the halftone value to a higher value, the exposure energy is increased to, for example, E2 so that the resulting halftone value is "8". However, according to FIG. 11, the resulting print density is "6", which is lower than the target value "8". In other words, a dot formed of three small exposure energies is thicker in density than a dot formed of one large exposure energy.

In order to prevent such a sudden drop of print density in the middle of the relation between exposure energy and the print density, the fourth embodiment uses a beam that irradiates a substantially middle portion of a pixel area in the advance direction. The beam on the substantially middle portion of the pixel area has an amount of exposure energy from which the print density in FIG. 11 just starts to rise from zero. In this specification, this amount of energy is referred to as "critical energy." As is apparent from FIG. 40, critical energy is insufficient to form a dot.

Figure 13:
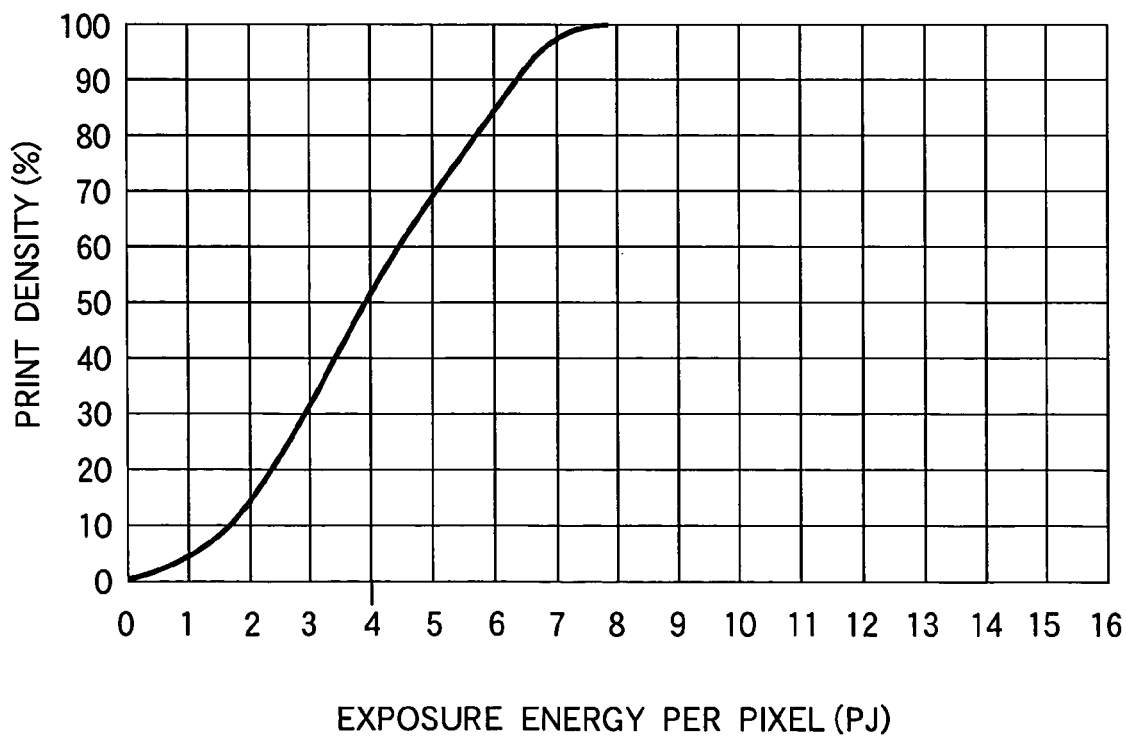
FIG. 13 illustrates the relation between exposure energy and print density according to a fourth embodiment when the substantially middle portion of a pixel area is irradiated with a beam having a critical energy.

FIG. 13 illustrates the relation between exposure energy and print density when the substantially middle portion of a pixel area i.e., substantially middle sub-line is irradiated with a beam having a critical energy emitted from an LED head 12.

Figure 14:
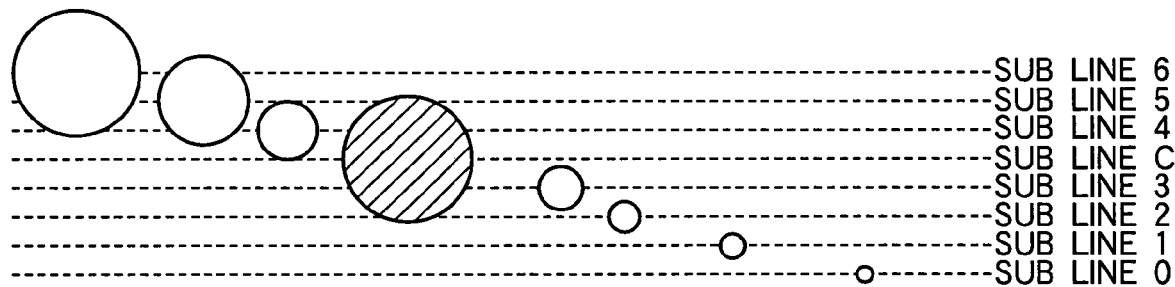
FIG. 14 is a model representation of beams that illuminate the respective sub-lines according to the fourth embodiment.

FIG. 14 is a model representation of beams that illuminate the respective sub-lines 0-3, C, and 4-6.

The beams except the one on the sub-line C have exposure energies represented in terms of the size of circle. Beams that illuminate the sub-lines 0-3 and 4-6 have the substantially the same cross sectional area and illuminate corresponding sub-lines for different length of time. A large circle on the sub-line C does not indicate an amount of exposure energy relative to the beams on the sub-lines 0-3 and 4-6 but simply exaggerates a location of the critical energy. A beam having a critical energy may illuminate an area of the same size as or larger than that of the areas illuminated by other beams.

Figures 15A, 15B:
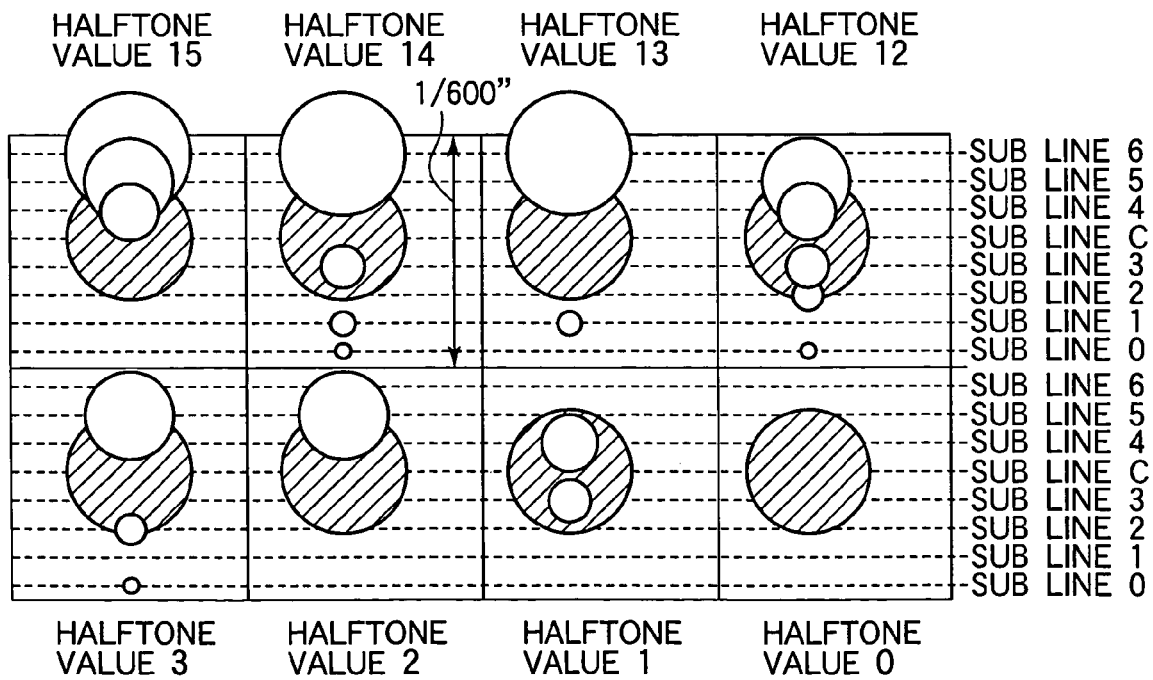
FIG. 15A illustrates an example of half tone pixel shaving various halftone values achieved by a combination of beams in FIG. 14.
FIG. 15B illustrates pixels of a variety of halftone values of FIG. 15A.

FIG. 15A illustrates an example of halftone pixel shaving various halftone values achieved by a combination of beams in FIG. 14.

FIG. 15B illustrates pixels of a variety of halftone values of FIG. 15A;

{Construction}

Figure 16:
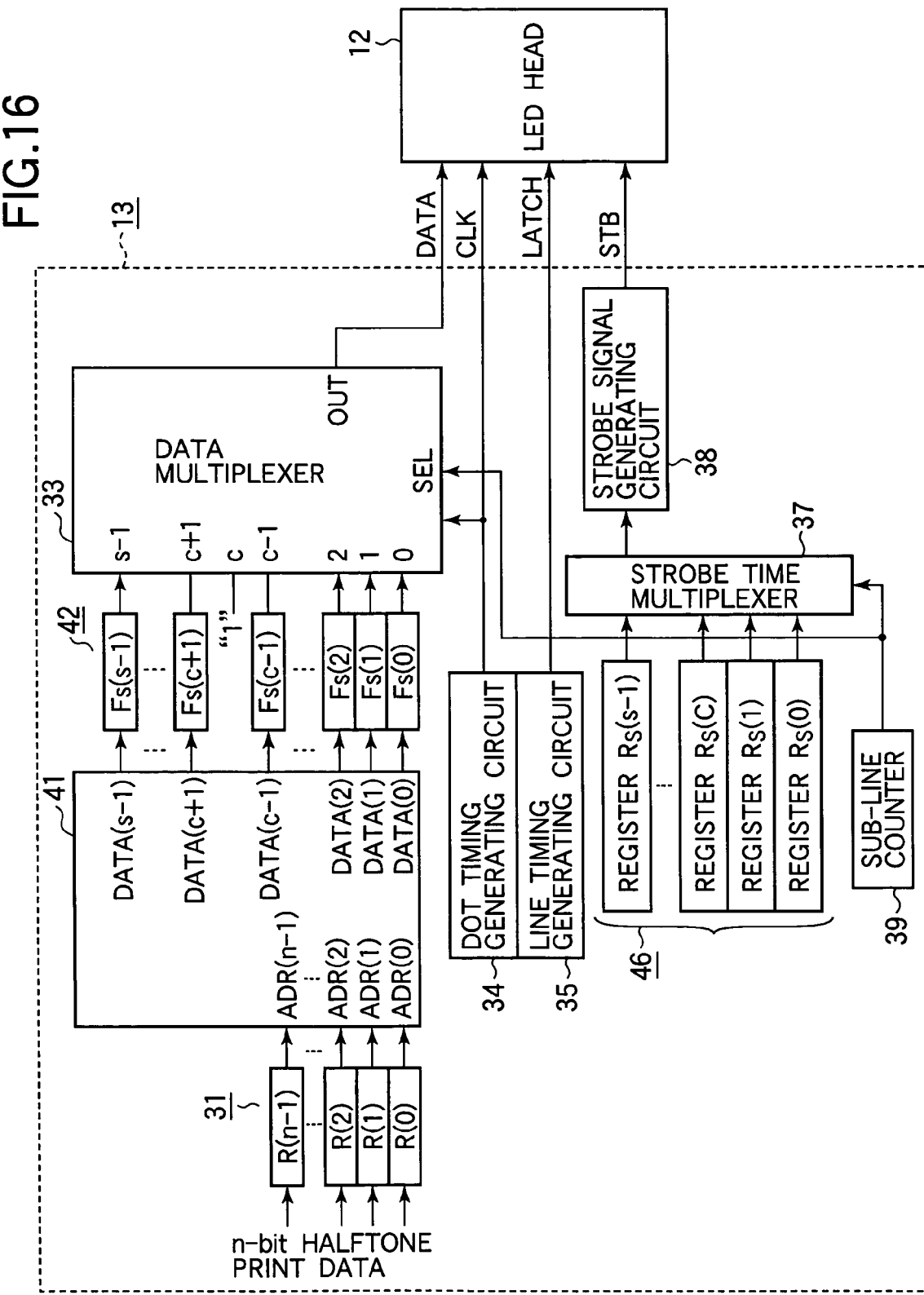
FIG. 16 illustrates a general configuration of the fourth embodiment.

FIG. 16 illustrates a general configuration of the fourth embodiment. Sub-line C lies in the middle or substantially in the middle of a total of s sub-lines in the advance direction and is illuminated by a beam having the critical energy. The input to the C-th input of the data multiplexer 33 is a logic "1" at all times and thus data signal DATA(i=c) is also a logic "1" at all times. Therefore, the halftone value-to-energy conversion table 41 has no output terminal for the sub-line C. The strobe time register bank 46 includes as many as s registers, including one for the sub-line C. The register for the sub-line C stores a strobe time equivalent to the critical energy.

{Operation}

Figure 17:
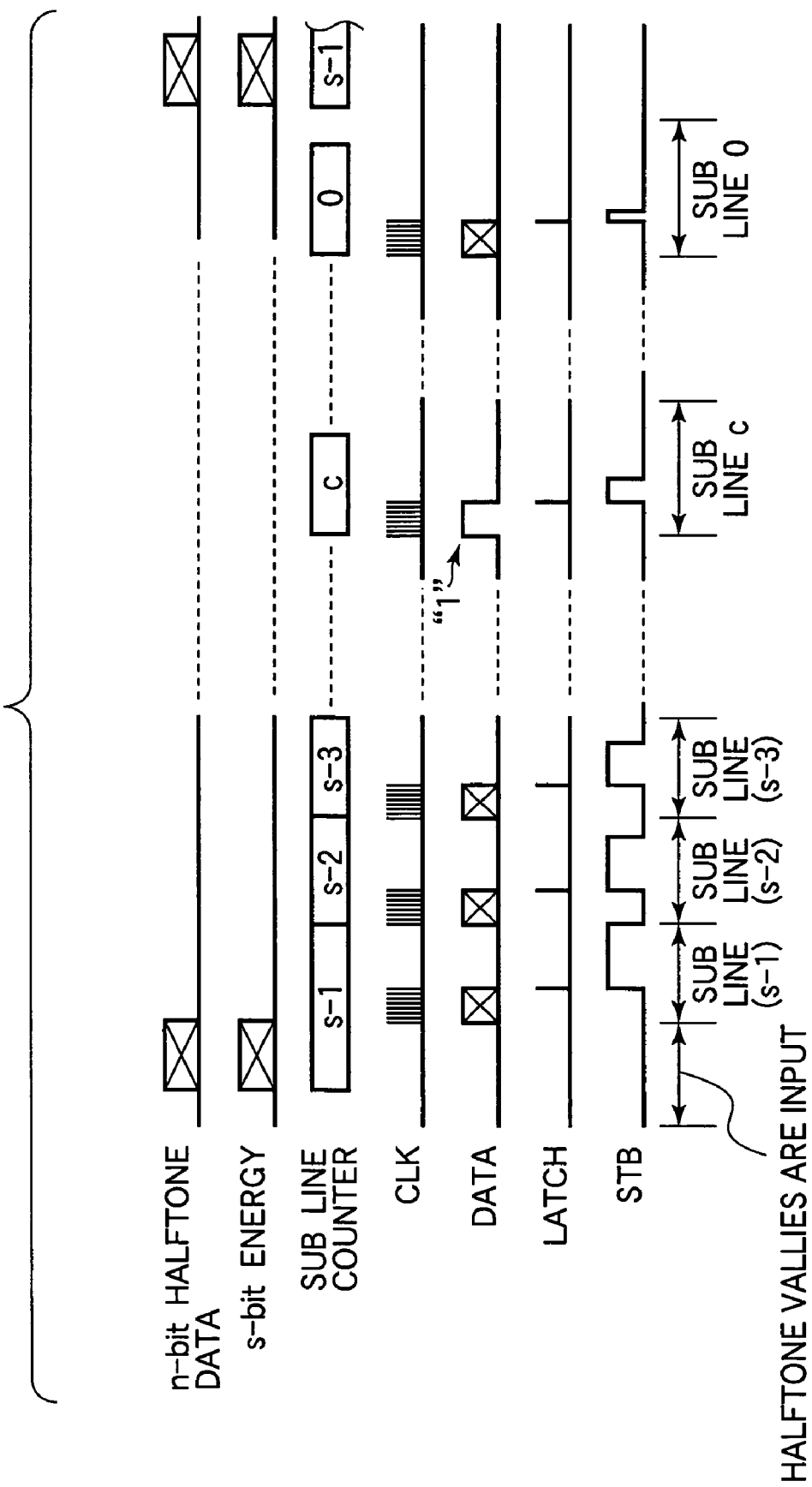
FIG. 17 is a timing chart illustrating the operation of the fourth embodiment.

FIG. 17 is a timing chart illustrating the operation of the fourth embodiment.

When the sub-line counter 39 is set to s−1, the bits of n-bit halftone data are input into the respective registers R(i) of the halftone value register bank 31 in order. The bits of bit data B(i) (i=1, 2, ..., n−1) are outputted from the respective registers R(i) and written into address ADR(i) (i=0, 1, 2, ..., n−1) of the halftone value-to-energy conversion table 41. The bit data B(i) (i=0, 1, 2, ..., n−1) is converted into data signal DATA(j) (j=0, 1, c−1, c+1, ..., s−1) expressed in s bits, which in turn is outputted to the binary sub-line buffer bank 42. It is to be noted that the data signal DATA (j=c) is "1" at all times.

The LED printer is operated to obtain the relationship between the halftone values and exposure energies for LEDs in FIG. 13. Then, the data signal DATA(j) is calculated based on the energy increment and the maximum energy.

The binary sub-line buffer bank 42 includes s sub-line buffers Fs(j) (j=0, 1, ..., c−1, c+1, ..., s−1) into which the respective data signal DATA(j) received from the halftone value-to-energy conversion table 41 is written in order. It is to be noted that the binary sub-line buffer bank 42 does not include a sub-line buffer for the sub-line C. Once the n-bit halftone data for one line has been received, the data signal DATA(j) for one line is stored into the respective sub-line buffers Fs(j).

Exposure of the sub-line (j) will be described. The LED head 12 in FIG. 16 is of the same configuration as the LED 12 in FIG. 1.

Because the count of the sub-line counter 39 is s−1, the data multiplexer 33 sends the data signal DATA for one line, i.e., the data signal DATA (j=s−1) stored in the sub-line buffer Fs(s−1) to the LED head 12 in synchronism with the clock CLK generated by the dot timing generating circuit 34, so that the data signal DATA for one line is written into the shift register 21 in the LED head 12.

Once all bits of data signal DATA(j) have been written into the shift register 21, the line timing generating circuit 35 sends the latch signal LATCH to the latch 22 in the driver chip 14, so that the latch 22 receives the data signal DATA in parallel data form.

The strobe time register bank 46 includes registers Rs(j) (j=0, 1, 2, ..., C−1, C, C+1, ..., s−1). Each of the registers Rs(i) stores a strobe time ts(j) (j=0, 1, 2, ..., C+1, C, C−1, ..., s−1) that represents a corresponding amount of exposure energy Es(j) (j=0, 1, 2, ..., C−1, C, C+1, ..., s−1) assigned to the sub-lines 0 to s−1, respectively.

Because the count of the sub-line counter 39 is s−1, the strobe time ts(j=s−1) stored in the register Rs(j=s−1) that corresponds to sub-line s−1 is sent to the strobe signal generating circuit 38 via the strobe time multiplexer 37. The strobe signal generating circuit 38 generates a strobe signal STB that corresponds to the strobe time ts(j=s−1), the strobe signal STB being sent to the LED head 12 and then input into the driver 23 in the LED head 12.

As a result, high-level bits of the data signal DATA in parallel data form sent from the latch 22 cause corresponding LEDs to be energized during the strobe signal STB, so that the energized LEDs emit light having an exposure energy of Es(j=s−1). In this manner, exposure is carried out for the sub-line 0.

When the sub-line counter 39 counts down to "s−2", the sub-line buffer Fs(j=s−2) outputs the data signal DATA for one line, i.e., the bit data B(j=s−2) in the serial data form to the LED head 12 in synchronism with the clock CLK, so that the bit data B(j=s−2) is written into the shift register 21 in the LED head 12.

Once all bits of data signal DATA(j) have been written into the shift register 21, the line timing generating circuit 35 sends the latch signal LATCH to the latch-22 in the driver chip 14, so that the latch 22 receives the data signal DATA(j) in parallel data form.

Likewise, exposure is carried out for the sub-lines s−3, s−4, ..., C+1, C, C−1, ..., and 0, thereby completing the exposure for forming dots for one line.

Then, the count of the sub-line counter 39 is set to "s−1" again, and n-bit halftone data for the next line is input into the respective registers R(i) of the halftone value register bank 31. In this manner, sub-dots on the respective sub-line (j) for the next line are formed under the control of the print controller 13.

A recent problem is that when a plurality of beams are used to form a halftone pixel, print quality deteriorates. One way of solving such a problem is to perform an arithmetic operation of the print data. The fourth embodiment is effective in establishing a linear relation between print density and exposure energy.

Fifth Embodiment

Figure 18:
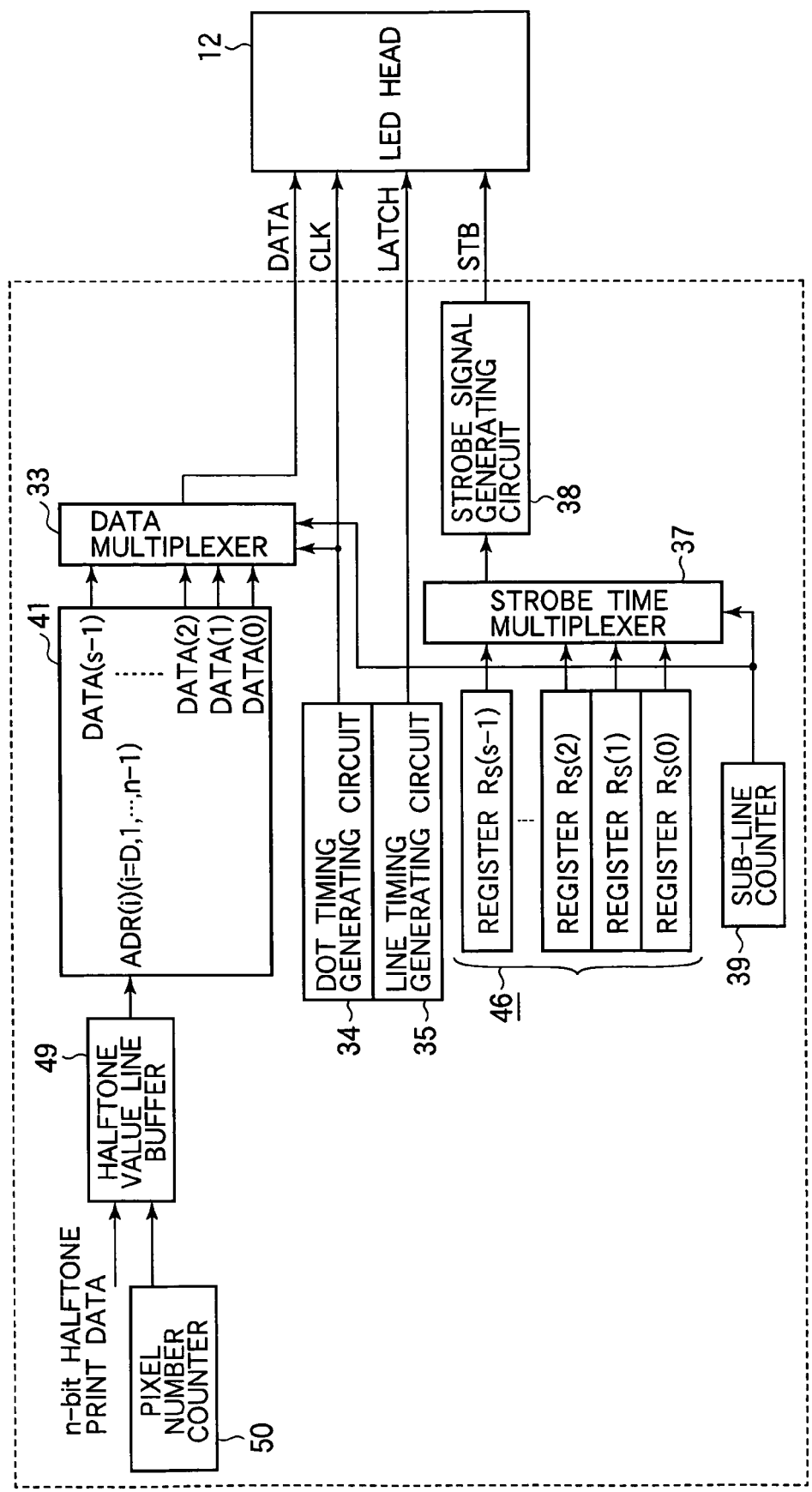
FIG. 18 illustrates a general configuration of a fifth embodiment.

FIG. 18 illustrates a general configuration of a fifth embodiment.

A halftone value line buffer 49 receives n-bit halftone data for one line from a host apparatus, not shown. A pixel number counter 50 outputs an address value that specifies a memory area in the halftone value line buffer 49 into which the n-bit halftone data for one line is written. The fifth embodiment does not use the binary sub-line buffer bank 42 as opposed to the fourth embodiment. Instead, the outputs of the halftone value-to-energy conversion table 41 are directly input into the multiplexer 33.

Figure 19:
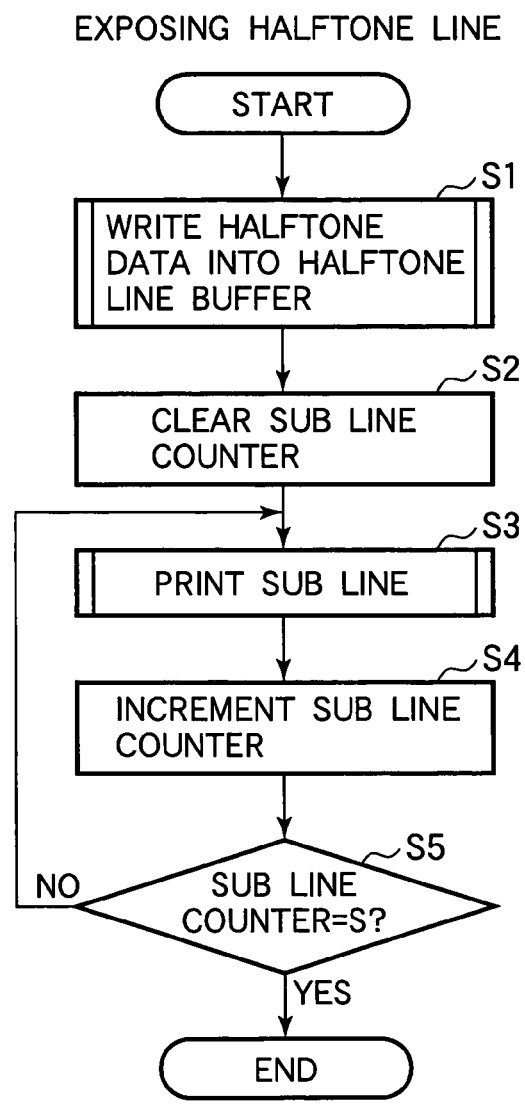
FIG. 19 is a flowchart illustrating the operation of the fifth embodiment.

FIG. 19 is a flowchart illustrating the operation of the fifth embodiment.

Step 1: Halftone data for one line is received from an external host apparatus and written into the halftone value line buffer 49.

Step 2: The sub-line counter 39 is cleared.

Step 3: Printing of one line is performed.

Step 4: The sub-line counter 39 is incremented.

Step 5: A decision is made to determine whether the content of the sub-line counter 39 is equal to s. If the content of the sub-line counter 39 is not equal to s, then steps 3-4 are repeated until the content of the sub-line counter 39 is equal to s.

Figure 20:
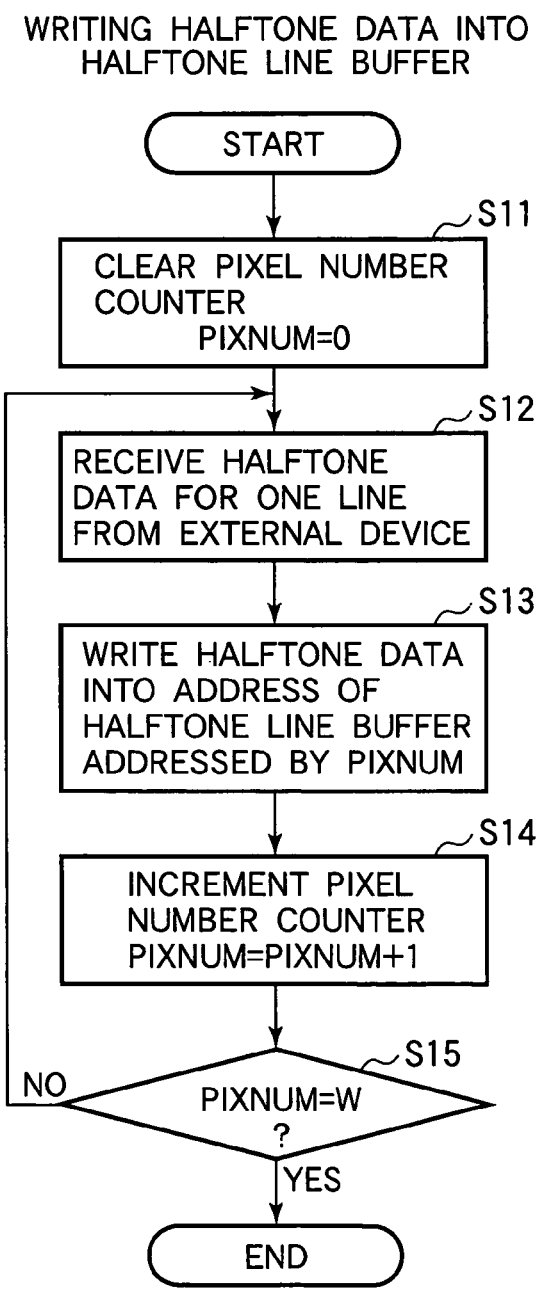
FIG. 20 is a flowchart illustrating the detailed operation at step 1 in FIG. 19.

FIG. 20 is a flowchart illustrating the detailed operation at step 1 in FIG. 19.

Step 11: The content PIXNUM of the pixel number counter 50 is cleared.

Step 12: Halftone data for one line is received from an external host apparatus.

Step 13: The halftone data for one line is stored into a memory area addressed by the content PIXNUM of the pixel number counter 50.

Step 14: The pixel counter 50 is incremented.

Step 15: A decision is made to determine whether the content PIXNUM of the pixel number counter 50 is equal to the number of pixels w in one line. If the content PIXNUM of the pixel number counter 50 is not equal to w, then steps 12-14 are repeated until the content PIXNUM is equal to w.

Figure 21:
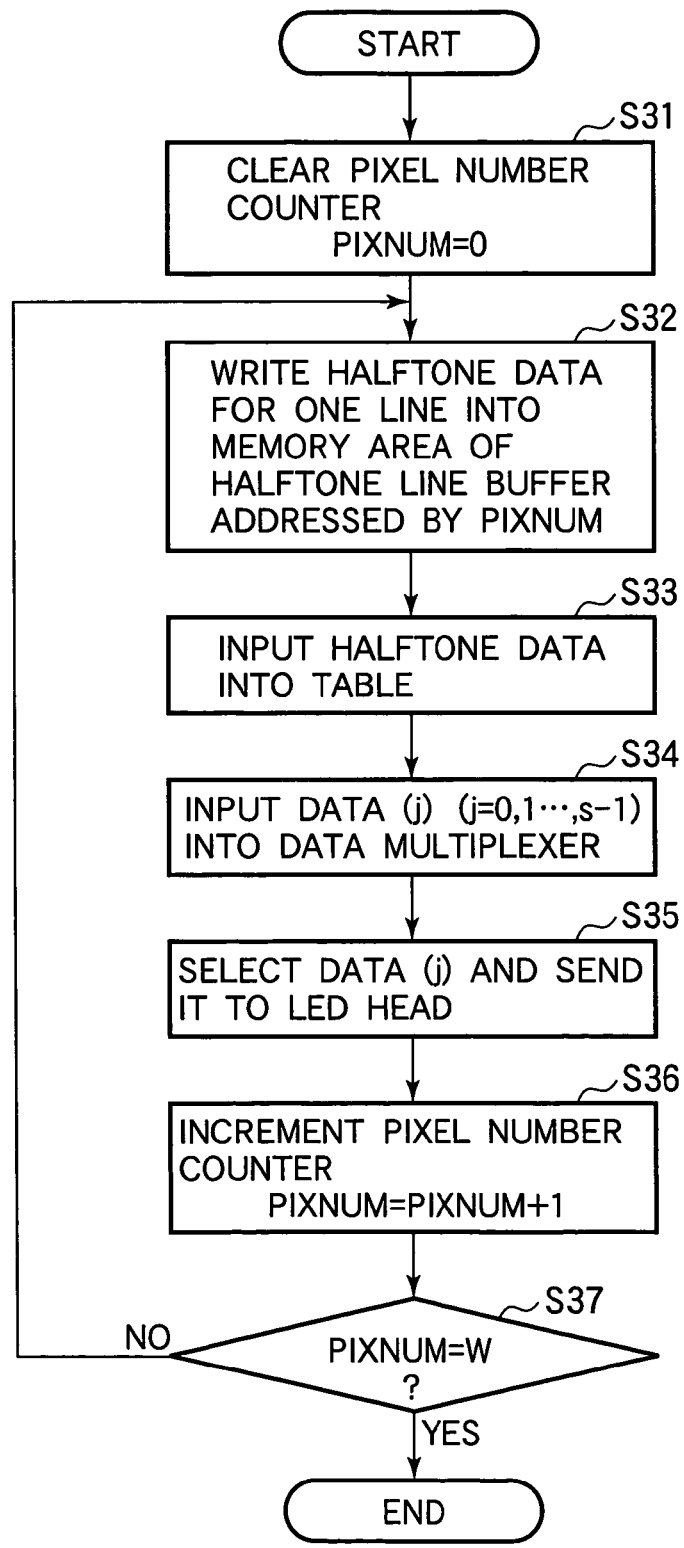
FIG. 21 is a flowchart illustrating the operation at step 3 of FIG. 19.
Figure 22:
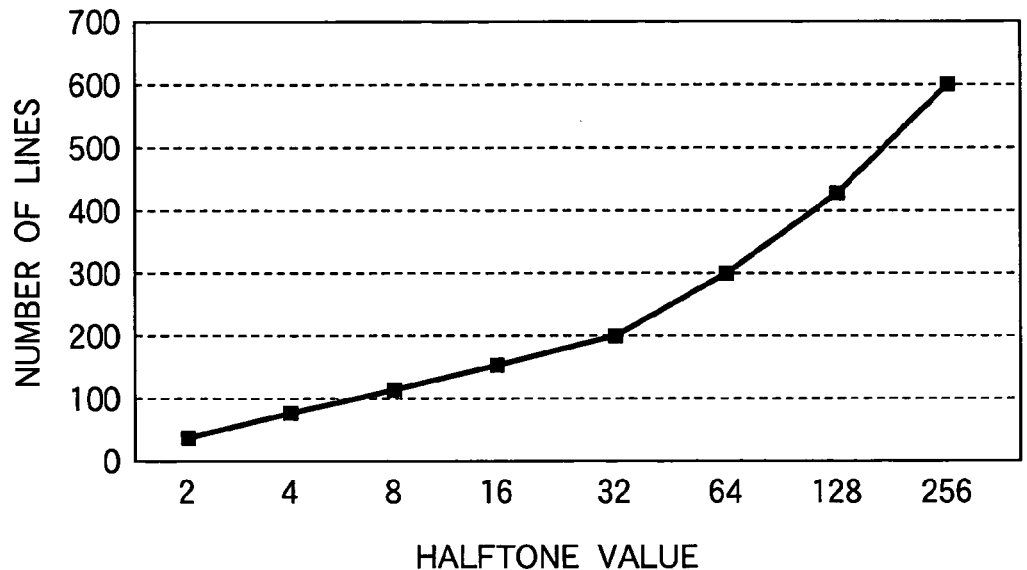
FIG. 22 illustrates the relationship between the halftone value and the number of printed lines of conventional art.
Figure 23:
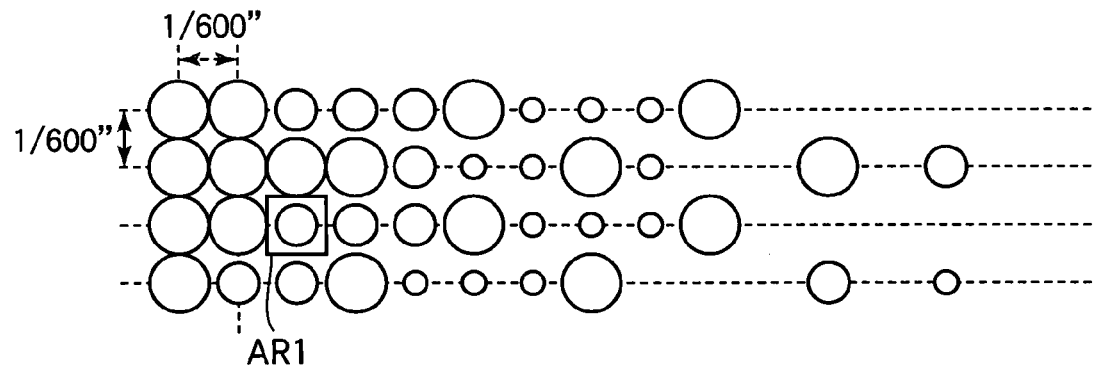
FIG. 23 illustrates an example of a halftone image printed by a conventional image forming apparatus.
Figure 24:
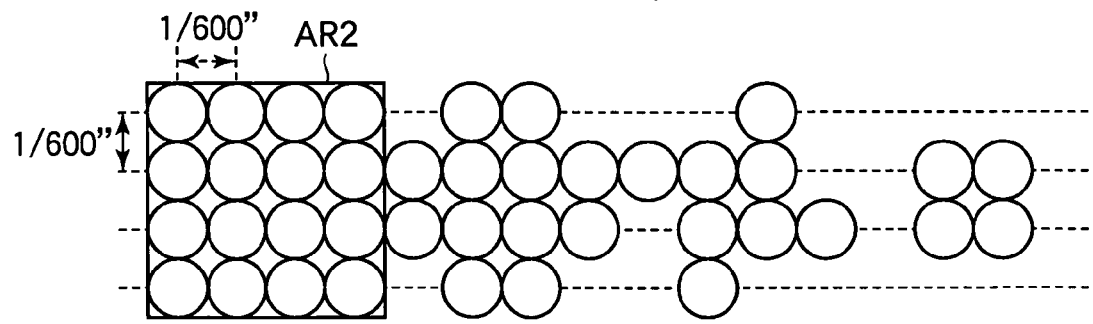
FIG. 24 illustrates another example of a halftone image printed by another conventional image forming apparatus.

FIG. 21 is a flowchart illustrating the operation at step 3 of FIG. 19.

Step 31: The pixel number counter 50 is cleared.

Step 32: A halftone value K of a pixel is read from a memory area in the halftone value line buffer 49, the memory area being addressed by the content PIXNUM of the pixel number counter 50.

Step 33: The halftone value K is inputted into an address of the halftone value-to-energy conversion table 41.

Step 34: The halftone value-to-energy conversion table 41 converts the halftone value k into a corresponding data signal DATA(j) The output DATA(j) (j=0, 1, 2, ..., s−1) of the halftone value-to-energy conversion table 41 is then input into the multiplexer 33.

Step 35: The multiplexer 33 selects data signal DATA(j) specified by the sub-line counter 39 and sends data signal DATA(j) to the LED head 12.

Step 36: The pixel number counter 50 is incremented.

Step 37: A decision is made to determine whether the content PIXNUM of the pixel number counter 50 is equal to w. If the content PIXNUM of the pixel number counter 50 is not equal to w, then steps 32-36 are repeated until the content of the sub-line counter is equal to w.

While the second embodiment uses as many as s binary sub-line buffers, the fifth embodiment uses a table that stores n-bit halftone data. Generally, the value of n is smaller than that of s. Thus, the configuration of the fifth embodiment is more inexpensive than that of the second embodiment while still providing as good print quality as the second embodiment. The configuration of the fifth embodiment may be combined with that of the third embodiment or the fourth embodiment.

The invention being thus described, it will be obvious that the same maybe varied in many ways. Such variations are not to be regarded as a departure from the spirit and scope of the invention, and all such modifications as would be obvious to one skilled in the art intended to be included within the scope of the following claims.

What is claimed is:

1. An image forming apparatus comprising:

an inputting section through which halftone data of pixels is received from an external device, the halftone data being defined by a number of bits; and a dot forming section that irradiates a charged surface of an image bearing body with light to form a plurality of dots in accordance with the halftone data of the pixels, the plurality of dots being aligned in a first direction and in a second direction substantially perpendicular to the first direction, the plurality of dots forming a plurality of lines of dots in the first direction, the second direction being a direction of travel of a print medium onto which images of the plurality of dots in the first and second directions are transferred from the image bearing body;

wherein dots in each one of the plurality of lines of dots in the first direction have a same exposure energy different from exposure energies of dots in the remaining ones of the plurality of lines of dots in the first direction;

wherein a plurality of dots aligned in a single line in the second direction are combined to form a single pixel having a halftone level described by the halftone data, each of the dots aligned in the single line being formed by an amount of exposure energy defined by a corresponding bit among the number of bits.

2. The image forming apparatus according to claim 1, wherein the plurality of lines include a first predetermined number of lines and the halftone data includes a second predetermined number of bits different from the first predetermined number.

3. The image forming apparatus according to claim 1, further including a conversion table that converts halftone data having a first number of bits into corresponding energy data having a second number of bits.

4. The image forming apparatus according to claim 1, wherein the dots on the plurality of lines of dots in the first direction are weighted in terms of exposure energy such that dots on a same line have a same weight and dots on different lines in the same pixel have different exposure energies.

5. The image forming apparatus according to claim 1, wherein at least one of the plurality of lines of dots is irradiated with a predetermined amount of exposure energy regardless of the halftone data of pixels.

6. The image forming apparatus according to claim 5, wherein the predetermined amount of exposure energy illuminates the charged surface of the image bearing body at a substantially middle portion of a pixel area including a middle one of the plurality of lines of dots.

7. The image forming apparatus according to claim 6, wherein the predetermined amount of exposure energy is insufficient to form a dot but is a part of an exposure energy to form a dot on another one of the plurality of lines of dots that is different from the middle one of the plurality of lines of dots.

8. The image forming apparatus according to claim 1, wherein a combination of dots in the plurality of lines in the first direction in the pixel represents a halftone value of the pixel.

9. The image forming apparatus according to claim 1, wherein each dot position on at least a first one of the plurality of lines of dotes is irradiated with an amount of exposure energy insufficient to form a single dot, and wherein when the amount of exposure energy insufficient to form a single dot is combined with an exposure energy that irradiates a dot on at least a second one of the plurality of lines of dots, a pixel having a corresponding halftone level is produced.

10. The image forming apparatus according to claim 9, wherein the plurality of lines of dots are aligned such that the plurality of lines of dots are substantially parallel to one another; the at least one of the plurality of lines of dots having the amount of energy insufficient to form a single dot lying substantially in the middle of the plurality of lines of dots.

11. The image forming apparatus according to claim 1, wherein the exposure energies for the dots on the plurality of lines of dots are weighted such that the exposure energy for each one of the plurality of lines of dots is different from the exposure energy for the remaining ones of the plurality of lines of dots.

12. An image forming apparatus comprising:
- an inputting section through which halftone data of pixels is received from an external device; and
- a dot forming section that irradiates a charged surface of an image bearing body with light to form a plurality of dots in accordance with the halftone data of the pixels, the plurality of dots being aligned in a first direction and in a second direction substantially perpendicular to the first direction, the plurality of dots forming a plurality of lines of dots in the first direction, the second direction being a direction of travel of a print medium onto which images of the plurality of dots in the first and second directions are transferred from the image bearing body;
- wherein dots in each one of the plurality of lines of dots in the first direction have a same exposure energy different from exposure energies of dots in the remaining ones of the plurality of lines of dots in the first direction,
- wherein a plurality of dots aligned in a single line in the second direction are combined to form a single pixel having a halftone level described by the halftone data, and
- wherein the plurality of lines in the first direction within the single pixel include a same number of lines as bits in the halftone data.

13. The image forming apparatus according to claim 12, wherein a number of the plurality of lines of dots is larger than a number of bits by which the halftone data is formed.

14. The image forming apparatus according to claim 12, further comprising:
- a print density storing section into which a desired print density is inputted by a user; and
- a correction section that corrects the exposure energy in accordance with the desired print density.

15. An image forming apparatus comprising:
- an image bearing body that bears an electrostatic latent image thereon;
- a charging member that charges a surface of said image bearing body;
- an exposing section including a plurality of light-emitting elements, said exposing section irradiating the charged surface of said image bearing body with light emitted by the light-emitting elements to form an electrostatic latent image;
- a developing section that deposits toner to the electrostatic latent image to form a visible image;
- a transferring section that transfers the visible image onto a recording medium;
- an inputting section through which halftone data of pixels is received from an external device, the halftone data being defined by a number of bits; and
- a controller that controls said exposing section to irradiate the charged surface of said image bearing body with the light in accordance with the halftone data of the pixels to form a plurality of dots, the plurality of dots being aligned in a first direction and in a second direction substantially perpendicular to the first direction, the plurality of dots forming a plurality of lines of dots in the first direction, the second direction being a direction of travel of a print medium onto which images of the plurality of dots in the first and second directions are transferred from the image bearing body;
- wherein dots in each one of the plurality of lines of dots in the first direction have a same exposure energy different from dots in the remaining ones of the plurality of lines of dots in the first direction;
- wherein a plurality of dots aligned in a single line in the second direction are combined to form a single pixel having a halftone level described by the halftone data, each of the dots aligned in the single line being formed by an amount of exposure energy defined by a corresponding bit among the number of bits.

16. The image forming apparatus according to claim 15, wherein a combination of the dots in the same pixel represents a halftone value of the pixel.

17. An image forming apparatus comprising:
- an inputting section through which halftone data of pixels is received from an external device; and
- a dot forming section that irradiates a charged surface of an image bearing body with light to form a plurality of dots in accordance with the halftone data of the pixels, the plurality of dots being aligned in a first direction and in a second direction substantially perpendicular to the first direction, the plurality of dots forming a plurality of lines of dots in the first direction, the second direction being a direction of travel of a print medium onto which images of the plurality of dots in the first and second directions are transferred from the image bearing body;
- wherein dots in each one of the plurality of lines of dots in the first direction have a same exposure energy different from exposure energies of dots in the remaining ones of the plurality of lines of dots in the first direction,
- wherein a plurality of dots aligned in a single line in the second direction are combined to form a single pixel having a halftone level described by the halftone data, and
- wherein a first distance between adjacent dots is greater than a second distance between adjacent ones of the plurality of lines of dots in the first direction, wherein a pixel width in the first direction is approximately equal to the first distance, and wherein a pixel length in a transverse parallel direction is also approximately equal to the first distance.

18. An image forming apparatus comprising:
- an inputting section through which halftone data of pixels is received from an external device; and
- a dot forming section that irradiates a charged surface of an image bearing body with light to form a plurality of dots in accordance with the halftone data of the pixels, the plurality of dots being aligned in a first direction and in a second direction substantially perpendicular to the first direction, the plurality of dots forming a plurality of lines of dots in the first direction, the second direction being a direction of travel of a print medium onto which images of the plurality of dots in the first and second directions are transferred from the image bearing body;
- wherein dots in each one of the plurality of lines of dots in the first direction have a same exposure energy different from exposure energies of dots in the remaining ones of the plurality of lines of dots in the first direction,
- wherein a plurality of dots aligned in a single line in the second direction are combined to form a single pixel having a halftone level described by the halftone data, and
- wherein the different exposure energies are related by factors of two, whereby a number of the total exposure energies is equal to two raised to the power of a number of the plurality of lines of dots in the first direction.

* * * * *